US012566914B2

(12) United States Patent
Xu et al.

(10) Patent No.: US 12,566,914 B2
(45) Date of Patent: Mar. 3, 2026

(54) SYSTEM AND METHODS TO FACILITATE CONTENT GENERATION USING GENERATIVE ARTIFICIAL INTELLIGENCE MODELS

(71) Applicant: Adeia Imaging LLC, San Jose, CA (US)

(72) Inventors: Ning Xu, Irvine, CA (US); Jean-Yves Couleaud, Mission Viejo, CA (US); Cato Yang, San Jose, CA (US)

(73) Assignee: Adeia Imaging LLC, San Jose, CA (US)

( * ) Notice: Subject to any disclaimer, the term of this patent is extended or adjusted under 35 U.S.C. 154(b) by 272 days.

(21) Appl. No.: 18/240,054

(22) Filed: Aug. 30, 2023

(65) Prior Publication Data

US 2025/0077765 A1      Mar. 6, 2025

(51) Int. Cl.
| | |
|---|---|
| *G06F 40/174* | (2020.01) |
| *G06F 3/0482* | (2013.01) |
| *G06F 3/04847* | (2022.01) |
| *G06F 16/2457* | (2019.01) |
| *G06N 3/0475* | (2023.01) |

(52) U.S. Cl.
CPC .......... *G06F 40/174* (2020.01); *G06F 3/0482* (2013.01); *G06F 3/04847* (2013.01); *G06F 16/24578* (2019.01); *G06N 3/0475* (2023.01)

(58) Field of Classification Search
None
See application file for complete search history.

(56) References Cited

U.S. PATENT DOCUMENTS

| | | | | |
|---|---|---|---|---|
| 2024/0193351 A1* | 6/2024 | Benedetto | ............. | G06F 3/0482 |
| 2024/0296276 A1* | 9/2024 | Hattangady | ........... | H04L 51/216 |
| 2024/0354130 A1* | 10/2024 | Cadoni | ................. | G06F 40/279 |

(Continued)

OTHER PUBLICATIONS

"DALL-E 2," OpenAI, https://openai.com/dall-e-2.

(Continued)

*Primary Examiner* — Tuan S Nguyen
(74) *Attorney, Agent, or Firm* — HG Law LLP

(57) ABSTRACT

The present disclosure is directed to systems and methods to enhance the process of creating an artificial intelligence (AI) generated content or content items, such as images, text, video, sounds, etc., using a text or other suitable prompt, such as via voice input. The systems and methods disclosed provide streamlined content generation with, e.g., reduced processing power and computing time. In an embodiment the systems and methods receive a prompt for generating a first content item using a generative artificial intelligence (AI) model and retrieve, based on the prompt, a collection of matching content items. The systems and methods may then receive input selecting one of the content items from the collection and identify a prompt used to generate the selected content item. The systems and methods may then merge using a trained natural language processing model, the received prompt with the prompt of the selected content item to create a third prompt. In an embodiment the systems and methods may modify the third prompt based on additional input and, based on the modified third prompt, generate a second content item.

20 Claims, 22 Drawing Sheets

(56)         References Cited

U.S. PATENT DOCUMENTS

2025/0022100 A1*    1/2025   Wu .......................... G06T 5/50

OTHER PUBLICATIONS

"DreamStudio," stability.ai, https://beta.dreamstudio.ai/generate.
"Fréchet inception distance," Wikipedia, https://en.wikipedia.org/wiki/Fr%C3%A9chet_inception_distance.
"Imagen: Text-to-Image Diffusion Models," Google Research, https://imagen.research.google/.
"Lexica," Lexica, https://lexica.art/.
"Models, Hugging Face," https://huggingface.co/models?pipeline_tag=text-to-image&sort=downloads.
"NLTK: Natural Language Toolkit," NLTK, https://www.nltk.org/.
"OpenArt," OpenArt, https://openart.ai/discovery.
"Playground," Playgound, https://playgroundai.com/.
"Prompt Generator for Textt2Img," socialbu, https://socialbu.com/tools/generate-prompt-text2img.
"PromptHero," PromptHero, https://prompthero.com/.
Zhang, et. al., "StackGAN: Text to Photo-realistic Image Synthesis with Stacked Generative Adversarial Networks," arXiv preprint arXiv:1612.03242 (2016).
Yalalov, et. al., "Best 100+ Stable Diffusion Prompts: The Most Beautiful AI Text-to-Image Prompts," Metaverse Post, https://mpost.io/best-100-stable-diffusion-prompts-the-most-beautiful-ai-text-to-image-prompts/.
"Sampler v Steps," Reddit, https://www.reddit.com/r/StableDiffusion/comments/xe26ob/sampler_v_steps/.
"SD Steps vs. CFG vs. Sampling Method," parrot zone, https://proximacentaurib.notion.site/SD-Steps-vs-CFG-vs-Sampling-Method-e8765704d8a6457ca3f66058466fe43a.
"Stable Diffusion Launch Announcement," stability.ai, https://stability.ai/blog/stable-diffusion-announcement.
"Stable Diffusion Samplers," NightCafe, https://nightcafe.studio/blogs/info/stable-diffusion-samplers (2023).
Kaddoura, Ahmad, "Stable Diffusion—Samplers," ArtStation, https://www.artstation.com/blogs/kaddoura/pBPo/stable-diffusion-samplers.
RupertAvery "Diffusion Toolkit Beta v0.9," GitHub, https://github.com/RupertAvery/DiffusionToolkit/releases/tag/beta_v0.9.
Karras, et. al., "Elucidating the Design Space of Diffusion-Based Generative Models," 36th Conference on Neural Information Processing Systems (2022).
Radford, et. al., "Learning Transferable Visual Models From Natural Language Supervision," arXiv preprint arXiv:2103.00020 (2021).
Ramesh, et. al., "Hierarchical Text-Conditional Image Generation with CLIP Latents," arXiv preprint arXiv:2204.06125 (2022).
Reed, et al., "Generative Adversarial Text to Image Synthesis," 33rd ICML (2016).
Rombach, Robin , et al., "High-Resolution Image Synthesis with Latent Diffusion Models", Rombach, et. al., "High-Resolution Image Synthesis with Latent Diffusion Models," Proceedings of the IEEE/CVF Conference on Computer Vision and Pattern Recognition (2022).
Saharia, et. al., "Photorealistic Text-to-Image Diffusion Models with Deep Language Understanding," arXiv preprint arXiv:2205.11487 (2022).

* cited by examiner

1301 — Receive a first prompt

1302 — Outputting result images

1303 — Satisfactory ?

YES

1304 — No Further Action

NO

1305 — Receive input selecting a closest matching image

1306 — Obtain prompt of closest matching image

1307 — Merge first prompt and prompt of closest matching image to create third promote 1308 — Adjust third prompt ?

YES

1309 — Update Prompt

NO

1310 — Generate image

1401

1402

CFG Scale: 15.0

CFG Scale: 9.0

CFG Scale: 8.0

CFG Scale: 7.0

CFG Scale: 5.0

CFG Scale: 3.0

1452

1451

1454

1453

SYSTEM AND METHODS TO FACILITATE CONTENT GENERATION USING GENERATIVE ARTIFICIAL INTELLIGENCE MODELS

BACKGROUND

Generative artificial intelligence has advanced to produce original requested content based on an input text or other suitable prompt. The resulting content can be realistic or in the form of a given style if so requested.

SUMMARY

Disclosed herein are systems and methods to enhance the process of creating an artificial intelligence (AI) generated content or content items, such as images, text, video, sounds, etc., using a text or other suitable prompt, such as via voice input. The systems and methods disclosed provide streamlined content generation with, e.g., reduced processing power and computing time.

Text-to-image models, for instance, are a type of neural network that generates images based on a textual input, e.g., a prompt, such as a sentence or a paragraph describing the requested image. These models have been the focus of significant research in recent years, with many different architectures and training methods proposed. Some approaches to a text-to-image model use a combination of a text encoder and a generative neural network to generate images from textual descriptions. With public releases, users have been testing these AI-image generation models at an exceptional rate, with multitudes of prompts to generate images. The images generated from these prompts are typically of varying success when compared to a human interpretation and often take several iterations of increasingly detailed prompts until the desired image is achieved. For instance, receiving the desired image on the first or second try is infrequent. Each iteration requires a substantial amount of time and processing resources, so much so that several models impose a monthly (or daily or per-session) limit of image requests (e.g., 20 requests prior to charging a premium). In one approach to artificially generated image creation, the image is generated in two-stages where the first stage is a text encoder which generates a low-resolution image, and the second stage is a conditional GAN (generative adversarial network(s)) which generates a high-resolution image.

Another approach uses a guided attention mechanism to selectively attend to different regions of the text in order to generate images that match the textual description more closely.

Another approach uses a two-stage model, where the first stage generates a CLIP (Contrastive Language—Image Pre-training) image embedding given a text caption, and a diffusion-based decoder at the second stage generates an image conditioned on the image embedding from the first stage. Another approach uses similar architecture but builds on a larger-size transformer language model pre-trained on text-only corpora, and it helps to boost both the sample fidelity and image-text alignment. Another approach improves the diffusion model training by introducing latent diffusion models that train in the latent space of the auto-encoder.

In another approach, a system presents an iterative process with numerous different variables to adjust to achieve a satisfactory result. The iterative process is repeated with parameter adjustment until the system starts returning images that look like the right artistic direction. Then a fine tuning and edition process starts. The main parameter that drives the image output is the original text in the text-to-image process. "Prompt crafting" is becoming something of a new science with users developing theories on how certain parameters affect certain results. There are also online tools that help generate prompt ideas. The tool will generate from a simple prompt a more complicated prompt. For example, if a user inputs "a cat sitting by a window," the tool generates a more detailed version, such as "a cat sitting on a window-sill, the windowsill in a room, the cat facing away and looking out the window." However, these generated prompts often might not yield desirable results.

Another approach in text-to-image tools incorporates scans to a user local diffusion-generated image directory and extracts prompts that were originally used to create the images in the first place and makes them searchable. This tool, however, does not offer multi-user support and does not allow image search and similar prompt extraction.

In another approach, websites provide image search functionality for AI-generated images. Some websites only provide image results with corresponding prompts, and some provide results including also the model name and parameters used to generate the results. These websites provide visual feedback of AI-generated images and corresponding prompts, and those prompts can generate new images using the text-to-image model.

These approaches often require substantial iterations of presenting content and receiving feedback to reach a desired image. The long stretch of continual trial and error is not only time-consuming but also taxing on computing systems. Tremendous system resources are used in each iteration of image generation-without a guarantee of success. Performance is resource intensive as the process often requires iterations refining the prompt if the output is not desired. As a result, all these approaches have limited output and availability. There exists a need to reduce the iterations of prompting and generation, as well as the resource demand for AI generation computer systems.

In some embodiments, a system receives an input text prompt describing an image to be generated. The system may then analyze the prompt and suggest updated parameters including the model and sampler used. The system may receive instructions to merge prompts of previously generated images and the original prompt. The system may analyze and merge prompts using language analysis that segments and values portions of the prompts to identify repeating or priority portions. It may further search a database of previously AI-generated images and their metadata using the original, updated, or merged prompt and return result images. From the result images, the system may receive a best match. If the best match is satisfactory, the process may end with the best match. Alternatively the system may continue the process using the prompt and/or parameters that generated the best match image to inform the method to generate the desired image. By using suggested inputs and referencing previously successful prompts and parameters, the system bypasses many of the iterations necessary in other approaches. This streamlined approach conserves computing power and resources, as well as producing the desired image more quickly with fewer iterations and less frustration.

DETAILED DESCRIPTION

Figure 1A:
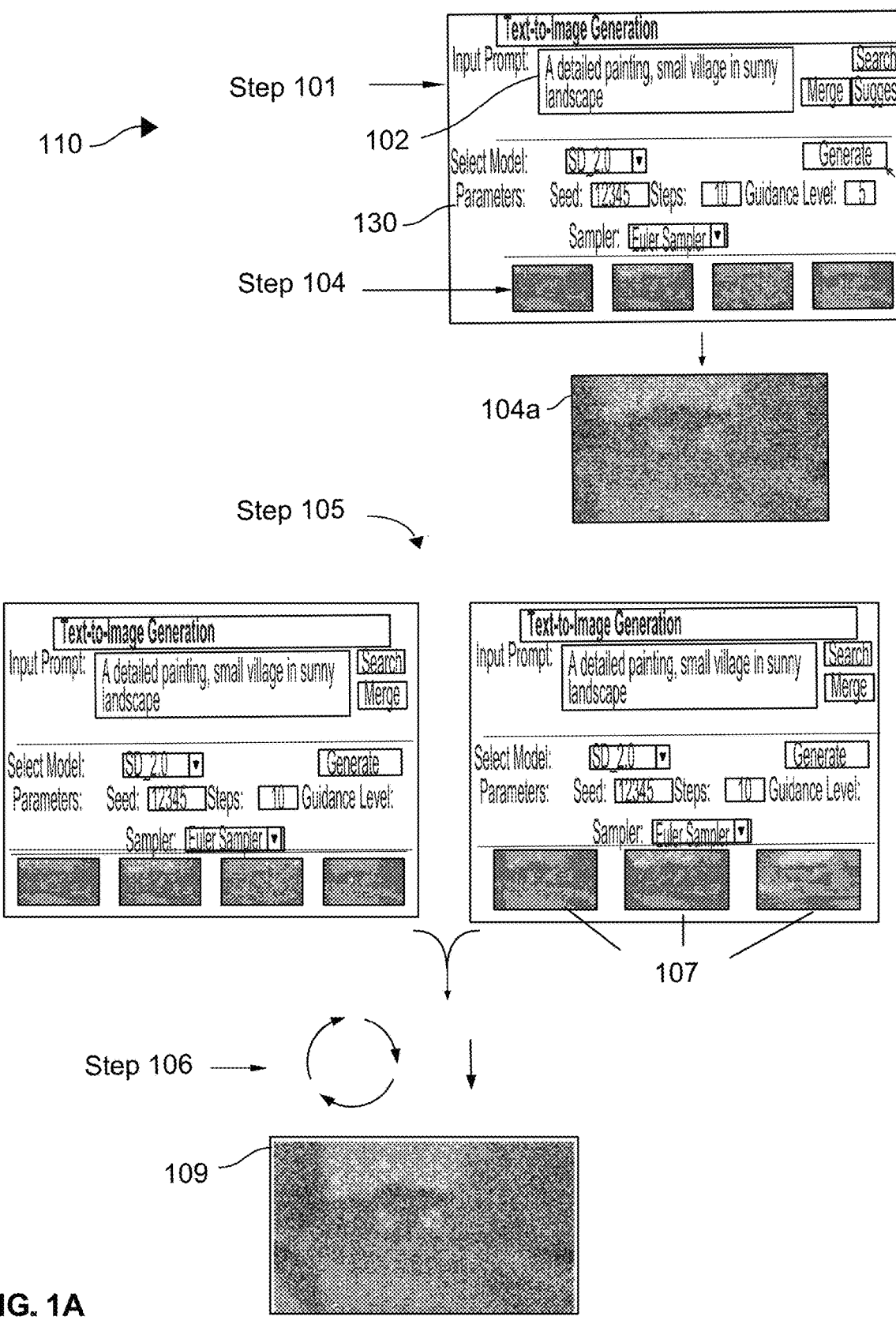
FIG. 1A shows an overview of an example image generation system in accordance with the present description.

FIG. 1A shows an example embodiment of the systems and methods described herein. In step 101, the system 110 presents a user interface 130 through which the system receives a prompt 102 to generate an AI-generated content item such as image 109. The disclosure in some embodiment also or alternatively generates other content items such as video, text, audio, 3-D and 2-D models, animation, and multimedia among others. Prompt 102 may be, for example, text describing a requested image 109. In some embodiments, the prompt may be a single prompt. In some embodiments, explicitly two or multiple prompts may be provided. In some embodiments, the prompt includes negative prompts, which may indicate characteristics that the generated image should not include, for example. In some embodiments, step 101 may also include receiving, through the user interface 130, generation parameters, such as a sampler (e.g., an image generation algorithm), seed, model, or other information. Based on the received prompt and/or parameters the system may, in some embodiments, suggest updates to the entered information to improve or expedite content generation. At step 104, using the prompt and parameters, the system searches a database that stores previously-generated content items, such as images, for content items that may satisfy the prompt, and displays the search result content items. In response to displaying or providing the result content items, the system may receive an indication that a content item, such as an image, of the search results is selected as a closest match 104a. The system may then update the search of the database with the information that the closest match 104a is similar to the searched-for image 109. It may accordingly merge metadata connected with the closest match 104a with the original prompt 102 and generation parameters, and again execute a search at step 105. The system may then again display content items resulting from the updated search of the database of previously generated content items using the merged metadata, and receive a second closest match selection. The system may also receive updates to the prompt, prompts, or parameters. Every time the prompt is changed, the system may present a suggested model and sampler based on the prompt-based model and sampler classifiers. At step 106, the system may generate another iteration of the search using updated prompts or parameters or merging metadata of selected closest matches to show search results 107. At any point the system may receive instructions to generate a content item such as image 109 without searching the database using either the original prompt and generation parameters, suggested prompt and generation parameters, merged prompt and generation parameters, or any combination thereof. The system may repeat step 106 as desired until a final content item such as image 109 is chosen among search results or generated.

Figure 1B:
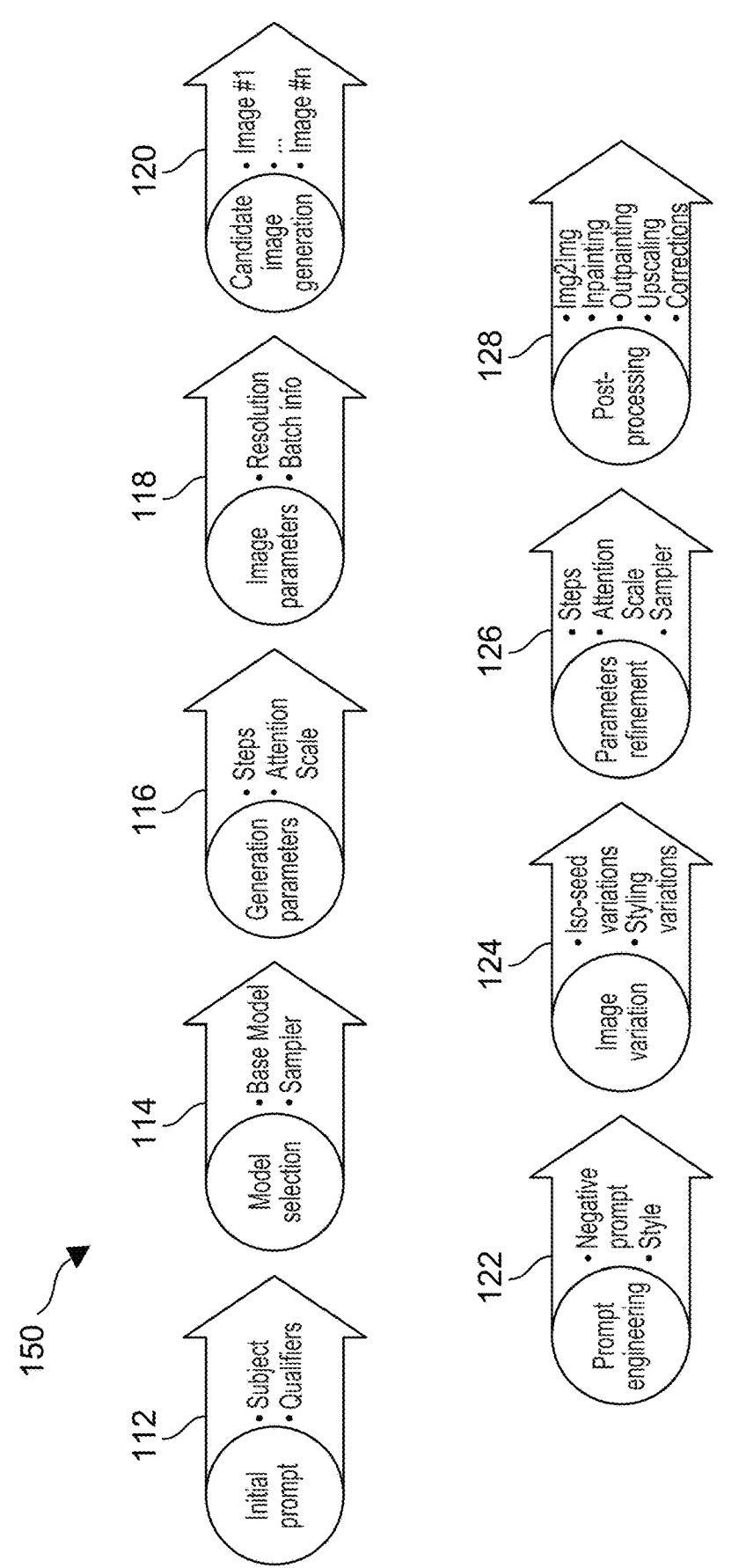
FIG. 1B shows an example process in accordance with common approaches to image generation.

FIG. 1B shows an illustrative process of creating an AI-generated images using an existing system 150 rather than system 110. In such a process, a user interface provides a number of variables to direct and begin the process. First, at step 112, the system 150 receives an initial prompt that includes a subject and qualifiers. At step 114, the system 150 receives model selection parameters, which may include a base model and a sampler. At step 116, the system 150 may receive generation parameters, such as steps and attention scale. At step 118, the system 150 receives image parameters, such as resolution and batch information. At step 120 it generates images, image 1 through image n. The system, 150 repeats the process with parameter adjustment until the generated images begin resembling an intended image. At that point, a fine tuning and edition process can start. At step 122 the system 150 performs prompt engineering to analyze and incorporate negative prompts and style indications, for example. At step 124 the system 150 begins image variation including iso-seed variation and styling variations. At step 126 the system 150 refines parameters, related to steps, attention scale, and/or sampler, for example. At step 128 the system 150 begins postprocessing incorporating, for example, further image-to-image generations, inpainting, outpainting, upscaling, and corrections. Although, the process of system 150 also generated AI-generated images, it is resource intensive and would benefit from the streamlining system 110 disclosed herein offers.

Figure 2:
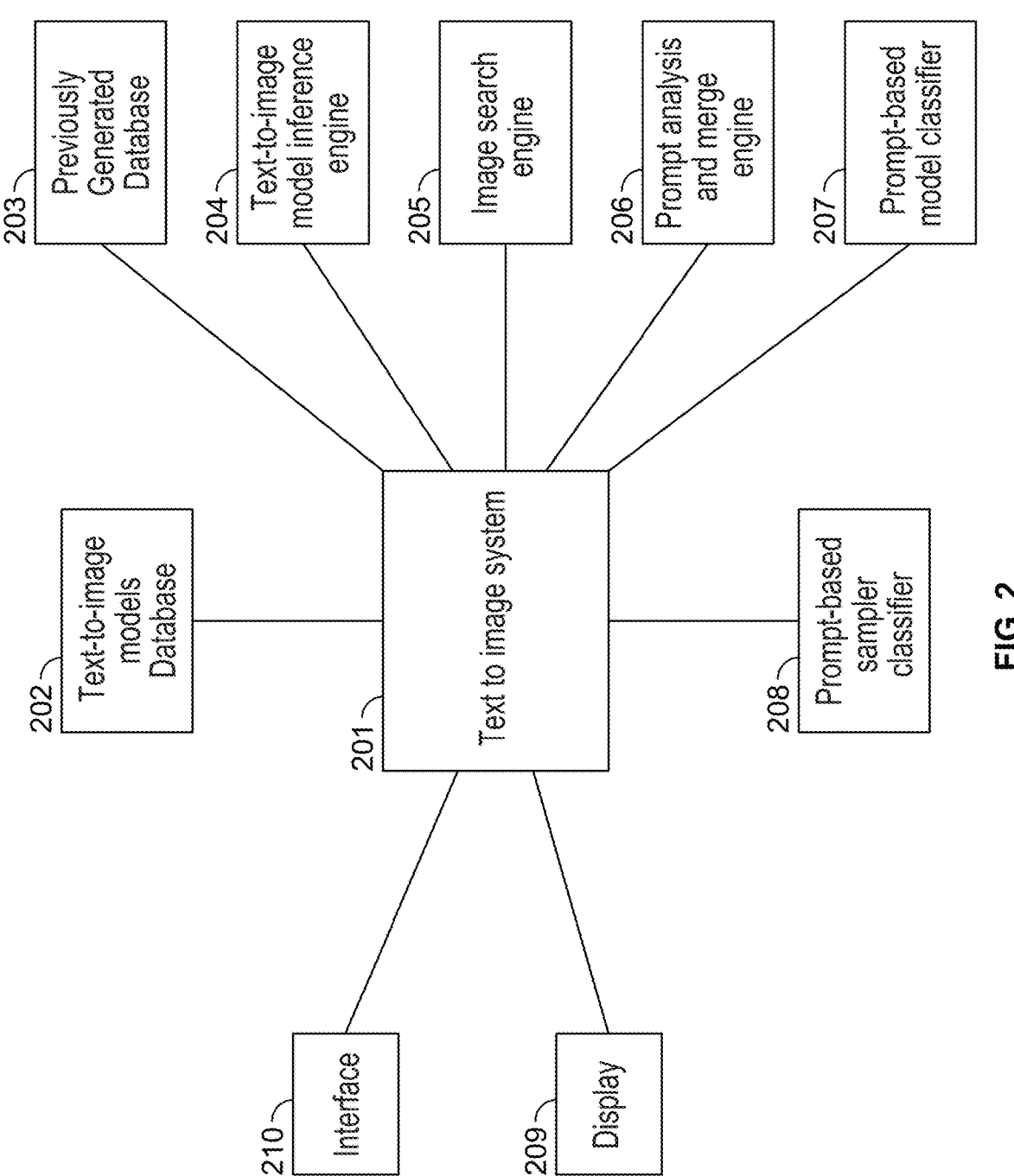
FIG. 2 shows an example architecture of the system of FIG. 1A in accordance with the present description.

FIG. 2 shows an example environment of an embodiment of the disclosure including a text-to-image system 201 such as may exist within system 110. While system 201 describes a text-to-image system, in embodiments of the disclosed system which generate other types of content items, similar systems such as text-to-video systems or text-to-text systems, may replace system 201. The backend of system 201 contains several components that interact to create a system to efficiently generate a content item such as image 109. The backend may, in some embodiments, rely on database 202 that contains text-to-image models, and database 203 that contains images that previously have been successfully generated by system 201 or other text-to-content or text-to-image generation systems. Each image item in database 203 also contains metadata, including the reference to which text-to-image model generated the image, the original prompt used to generate the image, and all the adjustable parameters, including the sampler used, the seed number, etc. The backend of system 201 also contains, in some embodiments, a text-to-image model inference engine 204, an image search engine 205, a prompt analysis and merge engine 206, a prompt-based model classifier 207, and a prompt-based sampler classifier 208, all of which interact to drive the image generation described in FIG. 1A. The text-to-image model inference engine 204 may in some embodiments, using the prompt and parameters as input, generate an output image. The image search engine 205 may search the database 203 for the images most related to an input prompt 102.

The prompt analysis and merge engine 206 of system 201 is configured to analyze and merge multiple prompts. The prompt analysis and merge engine 206 may utilize Natural Language Processing techniques to complete the analysis and merging: a machine learning model may be trained to segment each prompt as main description and modifiers. For example, in the crafted prompt "a detailed painting, small village in a sunny fall landscape, crisp and sharp, Claude Monet, intricate detailed, innovation, bright modern style, artstation, unreal render, depth of field, ambient lighting, award winning, stunning," the "a detailed painting, small village in a sunny fall landscape" is the main description, while all the other words or combination of words such as "crisp and sharp," "Claude Monet," "intricate detailed" are classified as modifiers.

The prompt analysis and merge engine 206, in some embodiments, includes a sentence merging model that can be trained to merge the main descriptions of two prompts together by fine tuning a large pretrained language model, like OpenAI's GPT BERT, XLNet, or ROBERTa with collected training data. In order to merge the modifiers, engine 206 may tokenize each modifier into words, and tag each word with its part of speech (POS). Tokenization and POS can use an available trained model, for example, using NLTK (Natural Language Toolkit). For example, engine 206 may tokenize one prompt, "a detailed painting, small village in a sunny fall landscape, crisp and sharp" to recognize the words "painting," "village," and "landscape" as nouns while tagging "detailed" "small," "sunny," "fall," "crisp," and "sharp" as adjectives. The model may recognize that the prompt is seeking a "landscape painting" and that other words may be modifiers. In another prompt, "sunny rural landscape painting with a river and houses and leaves changing color" the words "landscape," "painting," "river," "houses," "color," and "leaves" may be tagged as nouns; the words "sunny" and "rural" are adjectives and the word "changing" is a verb. The model may recognize that the prompt is seeking a "landscape painting" and that the other terms are modifiers.

After removing stop words and stemming, the system 201 may identify identical modifiers in each prompt, and delete repetitions in the final merged prompt. For the remaining modifiers, the system 201 may use word embedding to identify semantically similar modifiers. In some embodiments, the system includes in the final merged prompt modifiers also in the generating prompt of a selected image, where the selected image is an image, such as, for example, image 104*a*. Modifiers that are neither identical nor semantically similar are kept as-is in the final merged prompt. Combining the above merged main description and modifiers together create the final merged prompt. In the examples above, "a detailed painting, small village in a sunny fall landscape, crisp and sharp" and "sunny rural landscape painting with a river and houses and leaves changing color," a model merging the two prompts may output a merged prompt such as "a sunny detailed landscape painting of a village with a river in the fall, crisp and sharp."

In another example, the system 201 receives a request to merge the prompts "a detailed painting, small village in a sunny fall landscape, crisp and sharp, 1890, 1880, 1870, Terry Redlin, intricate detailed" and "a detailed painting, small village in a sunny fall landscape, crisp and sharp, 1890, 1880, 1870, Kandinsky, intricate detailed, innovation, bright modern style, artstation, unreal render, depth of field, ambient lighting, award winning, stunning." The prompt analysis and merge engine 206 may analyze the two prompts. The prompt analysis and merge engine 206 may, for example, recognize the terms "a detailed painting" in each prompt as the main descriptor. It may further recognize overlaps and remove duplicates for the portions "a detailed painting, small village in a sunny fall landscape, crisp and sharp, 1890, 1880, 1870" and "intricate detailed." It may then keep the remaining modifiers to create a new prompt such as "a detailed painting, small village in a sunny fall landscape, crisp and sharp, 1890, 1880, 1870, Terry Redlin, intricate detailed, Kandinsky, innovation, bright modern style, artstation, unreal render, depth of field, ambient lighting, award winning, stunning." In one embodiment, the system may offer options to manage incompatible qualifiers. For example, "Terry Redlin" and "Kandinsky" are style qualifiers that are incompatible. In that case the system may offer an option to reconcile, that is to pick one qualifier, or to merge them.

In some embodiments the system 201 merges parameters into the text prompt. In such embodiments, merging the parameters will depend on the proposed model because different models have different formats to indicate parameters in a text prompt. Midjourney, for instance, uses a double dash and parameter name (e.g., --aspect, --seed, --version, etc.). Other models may not use a particular format (e.g., double dash), but can identify a parameter and value that is in-line (perhaps comma separated) with the rest of the text. For example, one text prompt including specified parameters may be: "An old priest with a red robe outside a church, Vincent Van Gogh, model SD_2.0, seed 12345, steps 10, guidance level 5, aspect ratio 1280:720, Euler sampler." For some models, parameters may be entered in fields (e.g., drop-down boxes, slider bars, and the like, such as in Stable Diffusion) that are separate from the text input. In such cases, system 201 may provide API interface instructions or other computer-readable instructions that access the suggested model and automatically populate parameter fields. The system 201 may access or store specifications of how different models process text, and receive and process parameter entries (e.g., via separate input fields, lines of code, formatted or unformatted text in the input box, etc.) to accommodate different or specific models. In an embodiment, if the system 201 receives a selection of an option to export a prompt and parameters, the system 201 identifies the suggested model, which may include a version number, determines the appropriate manner and format for entering parameters, and provides a suitable output for the merged prompt.

In an embodiment system 201 generates a prompt using a text description for an existing prompt, such as the prompt used to generate image 109, and given parameters. In such an embodiment, the generated prompt may include parameters in-line with text in a format suitable for a specific model as seen in the example, "An old priest with a red robe outside a church, Vincent Van Gogh, model SD_2.0, seed 12345, steps 10, guidance level 5, aspect ratio 1280:720, Euler sampler." In an embodiment the generated prompt may include computer-readable instructions configured to populate parameter fields of a specific model. The computer-readable instructions may be appropriate when a specific model receives parameters through designated fields such as a drop down menu.

In an embodiment, the input prompt 102 may first go through the prompt analysis engine 206 to obtain the modifier part of the prompt 102 before being used to train and infer the model and sampler. This is because the main description may be more focused on the content of the desired content item, while the modifier is more focused on the style, genre, etc. of the desired content item.

System 201 also includes prompt-based model classifier 207 and prompt-based sampler classifier 208. The prompt-based model classifier 207 and prompt-based sampler classifier 208 are trained classifiers that can, in some embodiments, predict and suggest the best model and sampler based on the input prompt using database 203. In the model classifier 207, the input for the classifier 207 is the prompt, such as 102, and the output of the classifier 207 is a model name or version, and sampler name. The prompt-based sampler classifier 208, encodes each model of a specific version contained in the metadata as a one-shot vector, and represents the input prompt 102 as text embeddings. A deep neural network with a SoftMax output layer may be trained as the classifier 208 to predict the encoded output. The same method can be applied to the prompt-based sampler classifier 208.

On the frontend of system 201, in some embodiments, is a user interface 210 which receives a prompt 102 for a content item. This prompt may become an inquiry to find the most related content items in database 203. User interface 210 may also include options to enter or edit prompts 102 or other generation parameters such as sampler, model, or seed model. The frontend of system 201 may also include display 209 for displaying user input and system 201 outputs such as search results and newly generated content items. Display 209 may be, for example, a screen on a user device.

Figure 3:
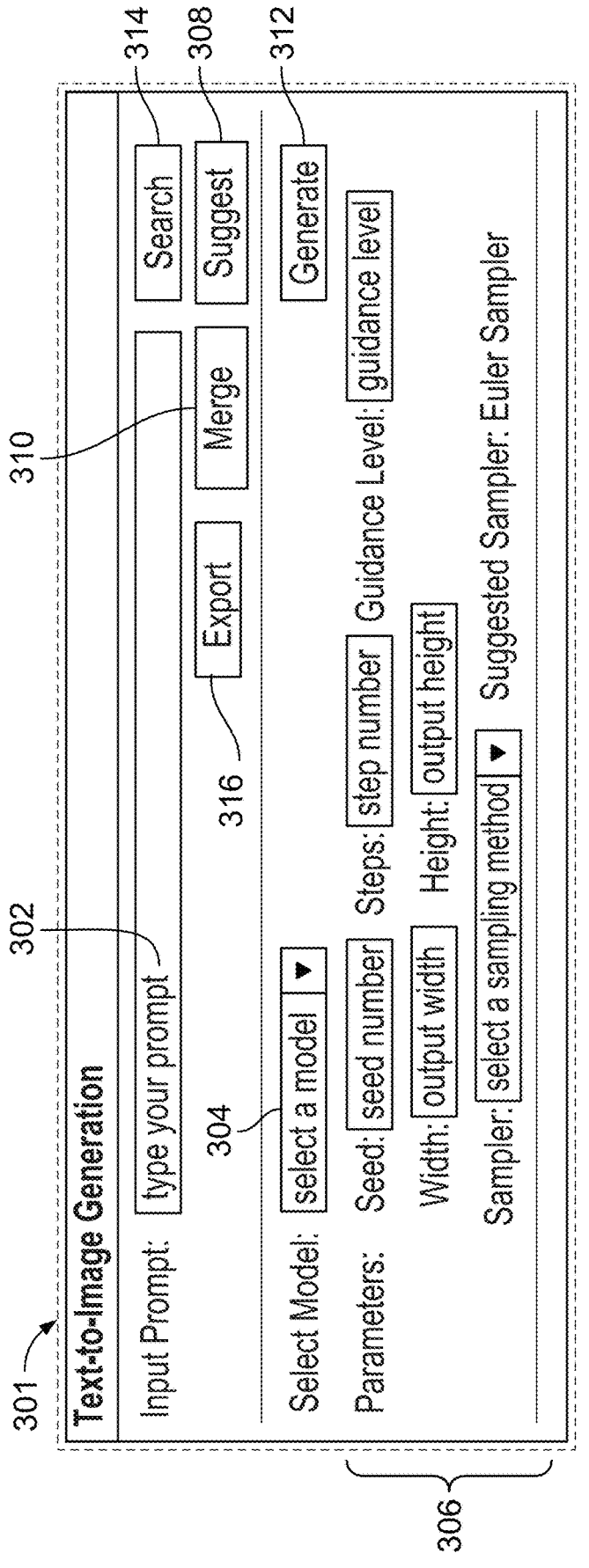
FIG. 3 shows an example user interface of an image generation system in accordance with the present description.

FIG. 3 shows an example interface 301 through which the system 201 may receive input. The interface may include a section 302 for receiving a text prompt 102. The text prompt may be a prompt similar to prompt 102. In one embodiment, the prompt may be image-based instead of text-based, using uploading or a URL to, for example, search the image database 203, and then in following iterations, search based on the selected best output image 104a. In embodiments using an image prompt, system 201 may incorporate into an inquiry metadata of the image acting as the prompt such as relevant key words, a sampler used, a text prompt, or parameters used to initially generate the image. The system may, in one embodiment, extract information from the image itself such as size, color, or CLIP embedding. The interface 301 may also include a section 304 for receiving a model, and section 306 that includes options for, for example, seed, width, height, sampler, steps, and guidance level. The interface 301 may further include an option 308 for presenting a suggestion, the suggestion offering a suggested prompt, model, sampler, seed, or any other search element. In one embodiment, the suggestion is a prompt suggestion and is the result of calling from the prompt based model 207 and sampler classifier 208. The interface 301 may also include an option 310 through which the system may receive instructions to merge or combine suggested input parameters or input parameters that have been successful in related inquiries and button or option 314 to generate an image. The interface 301 may also include search button 312 to search image database 203 for previously generated image matching or approaching the prompt. In embodiments generating content other than images, such as, for example, video or text, the search button may initiate searches of databases containing that type of content. In one embodiment, the enter key may initiate a search of generated images without the need for the system to receive a click on button 312. In one embodiment, the image search engine 205 will keep running based on the text entered or modified within the prompt input box 302, without receiving an indication to execute, similar to the Google search experience. The system 201 may further use autocomplete. The interface 301 may further include an option 316 to export a prompt to a specific model, such as a suggested model. In one embodiment, the system 201, after receiving a selection of the export option 316, determines the appropriate manner and format for entering parameters, and provides an output for the merged prompt that is suitable for execution using the specific model. The system 201 may then export or otherwise save the prompt and parameters to be used directly with various models.

The search option 312, which may search previously generated content in a database of content items previously generated using AI. For example, the search option 312, in one embodiment, searches previously generated images in the generated-image database 203 using an image search engine 205. The image search engine 205 may return the top ranked images from the generated-image database 203 according to their ranking scores, which measures how similar an image is to the input prompt 102. This ranking score calculation may take into consideration both the image content as well as its metadata of the images in the database 203. The metadata includes the prompt, the model, and the parameters being used to generate the image.

Figure 4:
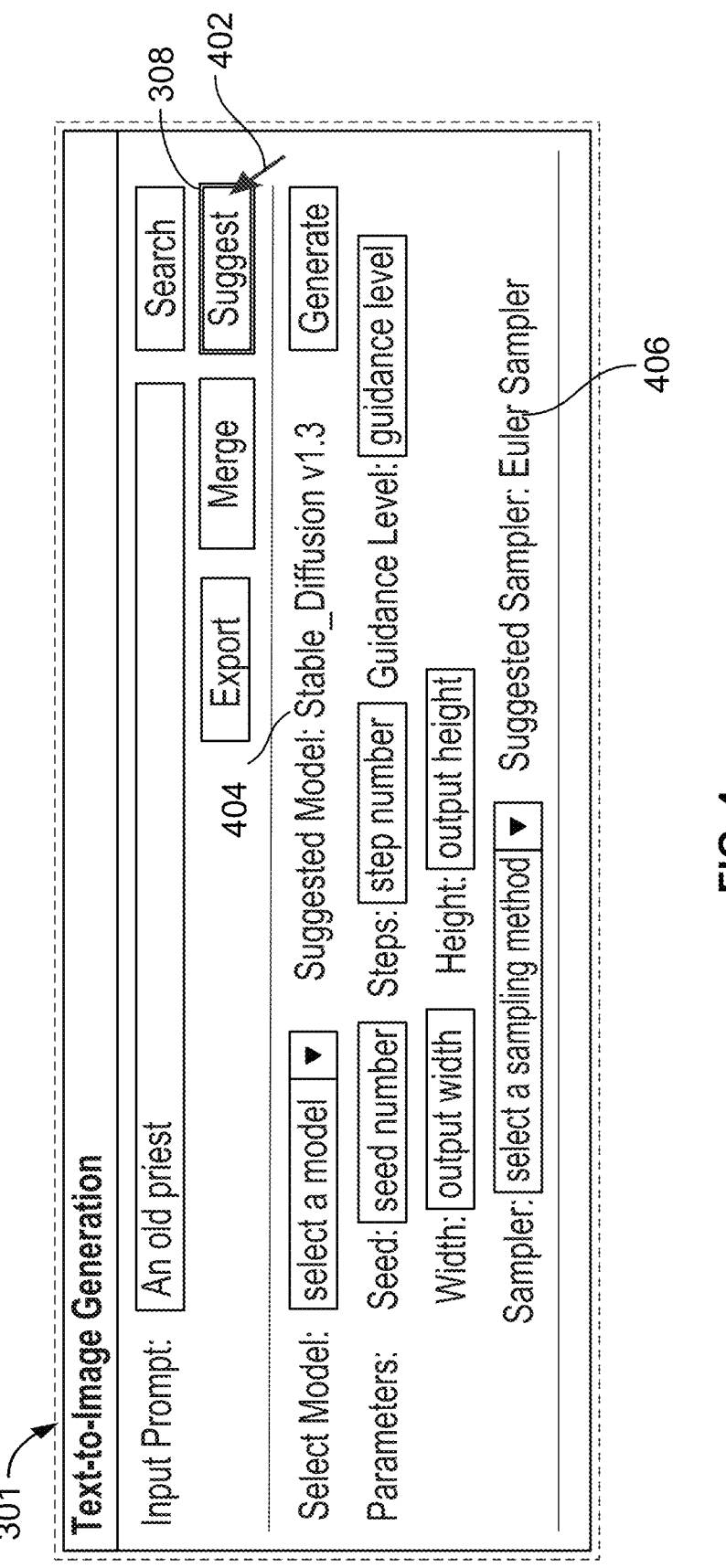
FIG. 4 shows the example user interface of FIG. 3 with a prompt and suggested parameters in accordance with the present description.

FIG. 4 shows an example embodiment of an inquiry the system may receive to generate an AI generated image. The figure shows interface 301 in which the system has received an input prompt of "an old priest." A cursor 402 indicates to the system a selection of the suggest option 308, and upon receiving that selection, the system has generated a suggested model 404, model Stable_Diffusion v1.3, and a suggested sampler 406, the Euler Sampler. In illustrative examples, the suggestions may be for a latest version of a model, the same model as a given image, a different model than a given image, a model selected based on user preferences, or a model selected based on the prompt. For example, a prompt requesting a realistic image may benefit from stable diffusion which is known for realistic output. On the other hand, a prompt requesting an abstract image may benefit from DALL-E 2 which is known for generating stylized images. The suggestion may also be based on the size of the image requested as models typically perform better on the native size of their training set. Similarly, in some embodiments, the suggestion is for, for example, a latest sampler, the same sampler as a given image, a different sampler than a given image, a sampler selected based on user preferences, or a sampler selected based on the prompt. For example, if a user preference indicates a preference for fast and converging image generation, the system 201 may suggest DPM++2M Karras which is known to generate images according to these features. On the other hand if a user preference indicates a preference for good quality images without a preference for convergence, the system 201 may suggest DDIM or DPM++SDE Karras. In some embodiments, the system may make these suggestions automatically without receiving specific instruction to do so.

Figure 5:
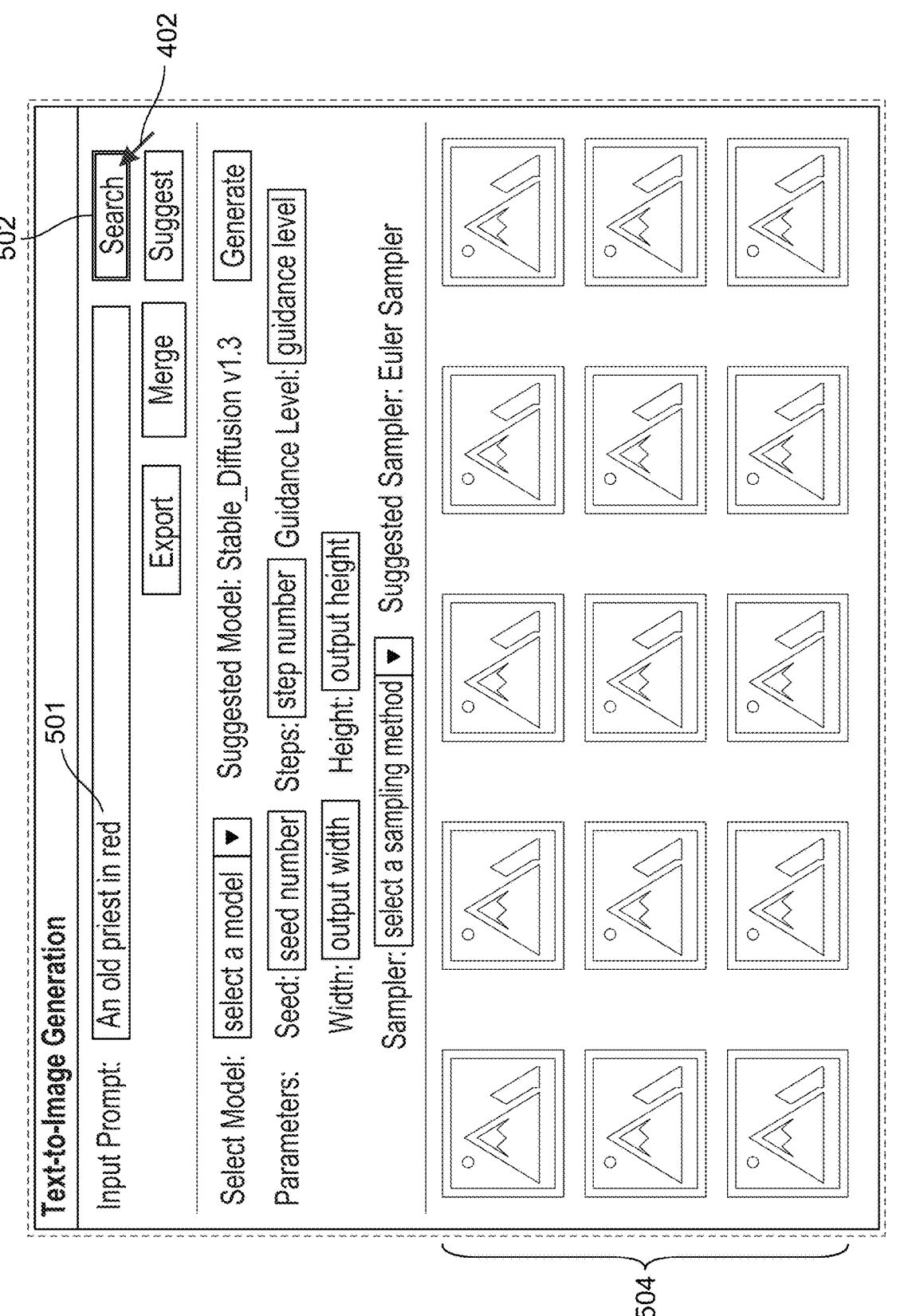
FIG. 5 shows the example user interface of FIG. 3 with result images displayed in accordance with the present description.

FIG. 5 shows a continuation of the embodiment of the inquiry shown in FIG. 4. In FIG. 5, the system has received a suggested prompt 501, "an old priest in red." Cursor 402 indicates a selection of the search option 502, instructing the system to execute a search for an image in search engine 205 using the inputs including the prompt 501. The image search engine may, in one embodiment, use the Contrastive Language-Image Pre-training (CLIP) model. CLIP contribute to computing the embedding vector of the input prompt. The embedding vectors of all the generated images in the database and the embedding vectors of their corresponding prompts are precalculated and stored on the server. In an embodiment, the image search engine may rank images generated with newer models higher when two images are equal on other metrics (e.g., image/prompt similarity, image quality, image popularity). In some embodiments, the system 201 may use a more sophisticated model than linear regression to combine the multiple components of the similarity scores for the image-search engine.

In an embodiment, system 201 ranks the returned images 504 based on a similarity score, which may be a combination of several different components: a first component may be the similarity score between the input prompt embedding vector and the generated image embedding vector (i.e., a comparison of an analysis of a prompt to that of a content item); a second component may be the similarity score between the input prompt and the prompts used to generate the images in the database using their respective embedding vectors (i.e., a comparison of analyses of a given prompt and an earlier prompt in a database); a third component may be an image quality score, measured by Fréchet inception distance (FID) or other equivalent quality metric. Other components can contribute to the overall ranking such as image popularity, measured as the number of times that particular image received a "like" or selection for download. In an aspect of the present embodiment, all these components are combined using linear weights, which can be pre-defined or computed using machine learning as more users use the service and select particular images.

Upon the search selection, the system 201 searches a database or store of previously generated images 203 for images with metadata matching the provided search elements including the prompt, "an old priest in red" in FIG. 5, and any other received search elements such as a model, seed, and/or sampler. The system may then display the search results 504, a collection of previously generated images matching the search parameters. The system 201 can then receive a selection of one chosen image of the previously generated images to download. In another embodiment this chosen image is designated as closest match 104*a* either as well as or instead of downloading. At this time, system 201 adds this chosen image to the generated-image database 203 indicating via metadata that the image is a match for the prompt, model, and parameters. If the results are not satisfactory, the process can repeat the steps of modifying the input prompt and changing parameters. At any stage whenever one of the returned images from the image-search engine meets the expectation, the system can directly download the returned image.

Figure 6:
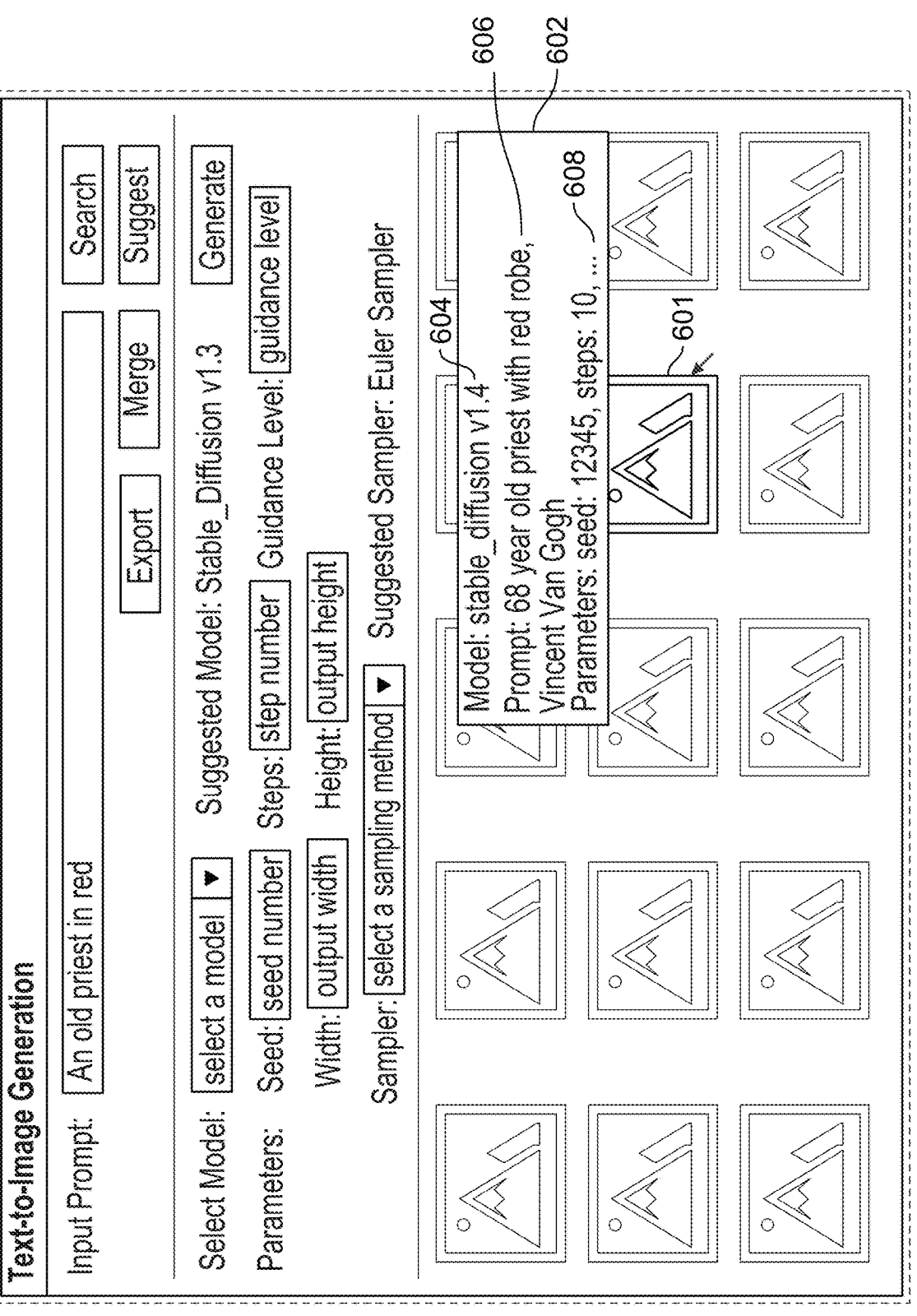
FIG. 6 shows the example user interface of FIG. 3 with a result image selected in accordance with the present description.

FIG. 6 shows the system receiving a selection of a particular search result 601 in the example embodiment shown in FIGS. 4 and 5. Scrolling may display more results. Box 602 displays metadata associated with result 601 which includes generation parameters in the form of a model 604, prompt 606, and parameters 608. In some embodiments, when a cursor hovers over an image in the search results, for example search result 601, a box displaying the associated metadata, for example box 602, may be displayed. In one embodiment, box 602 may be displayed for any selected search result.

Figure 7:
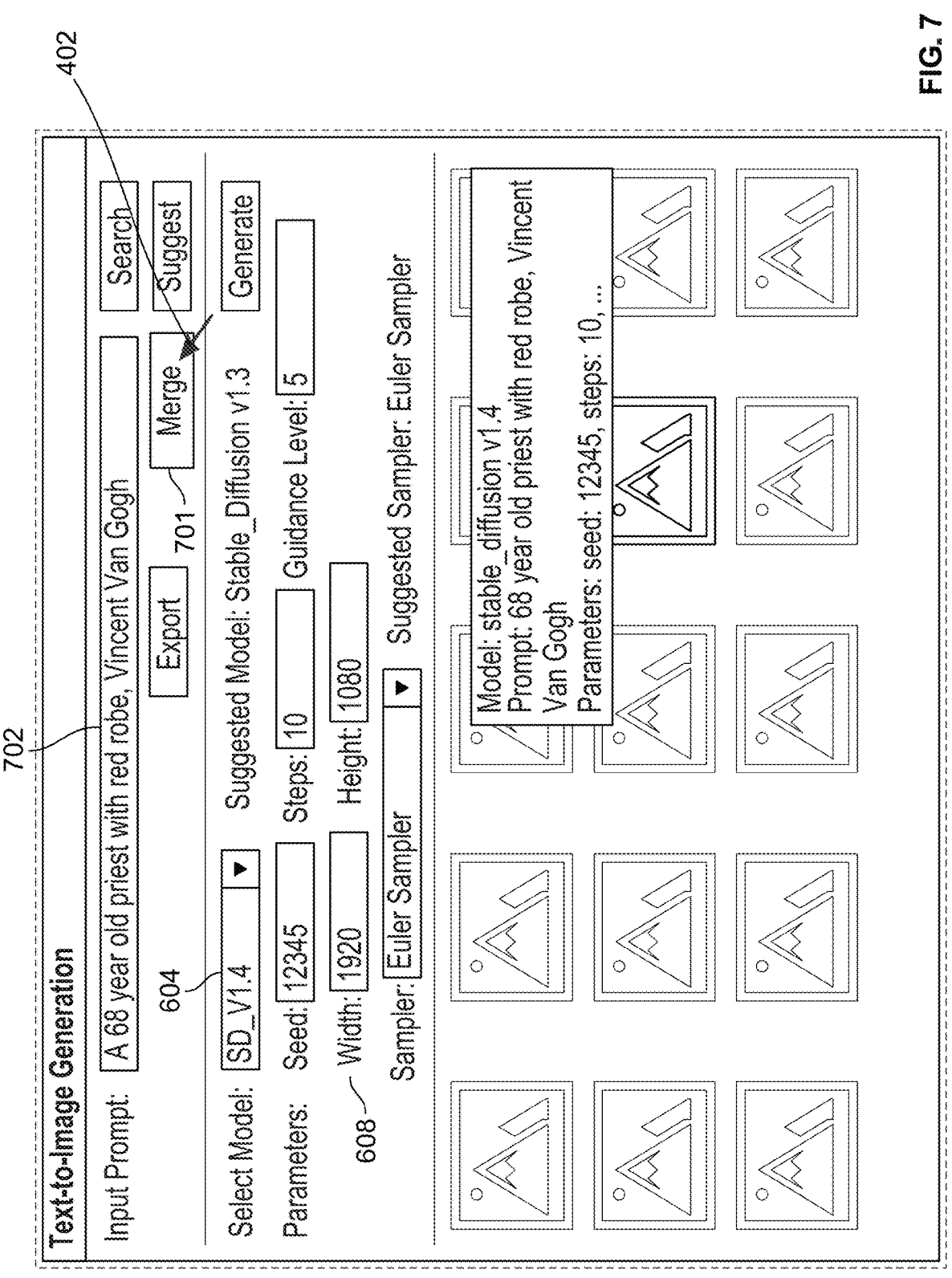
FIG. 7 shows the example user interface of FIG. 3 with the parameters of the selected image entered in accordance with the present description.

FIG. 7 shows the embodiment of FIGS. 4-6 receiving a request to merge the prompt 606 with prompt 501, as indicated by the position of cursor 402 over the merge option 701. Upon receiving the selection of merge option 701, the system uses the prompt analysis and merge engine 206 to merge the prompts 501 and 606 to create prompt 702 "a 68 year old priest with red robe, Vincent Van Gogh." The model 604 and parameters 608 are input upon receiving the instructions to merge as well.

Figure 8:
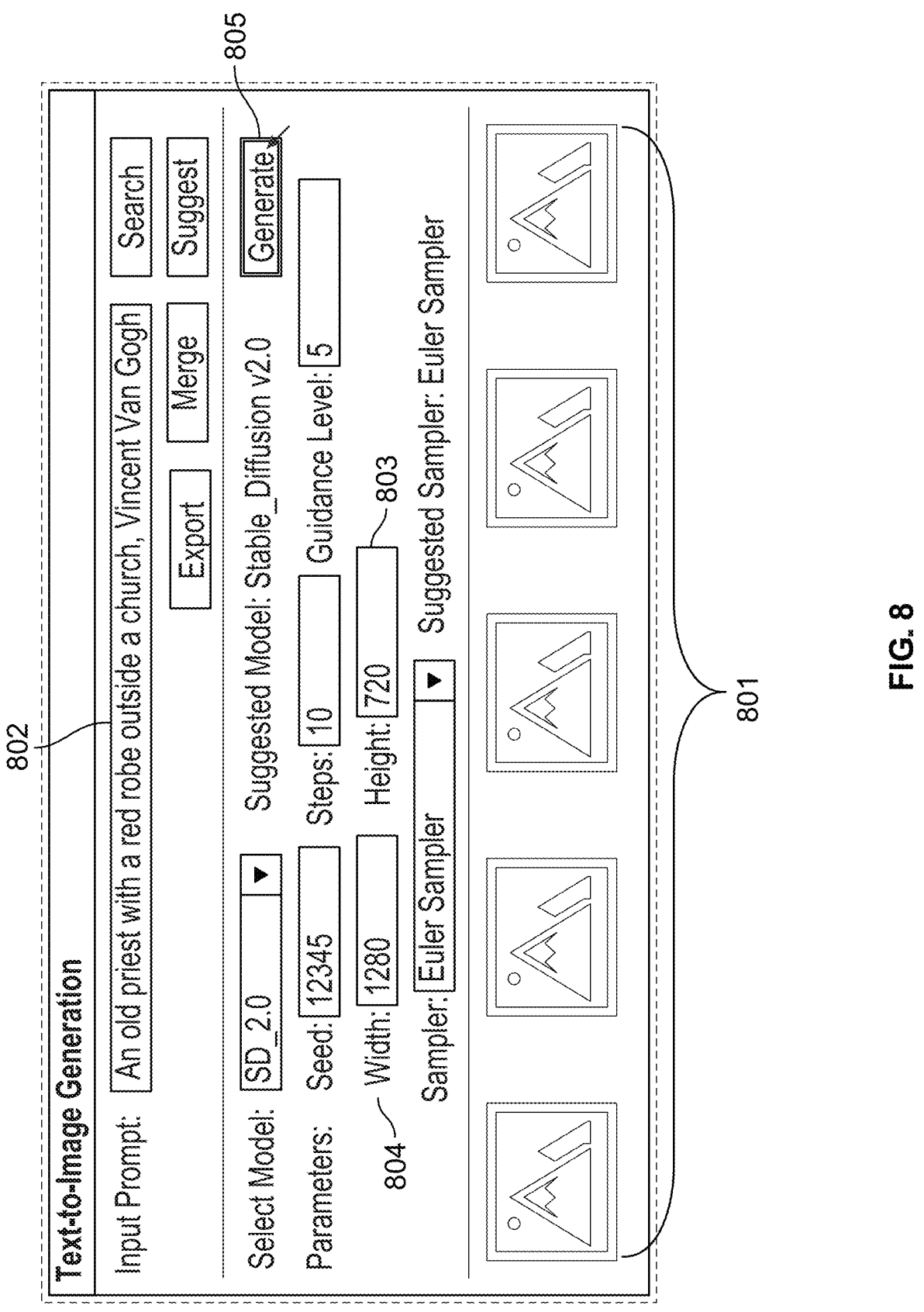
FIG. 8 shows the example user interface of FIG. 3 with an adjusted prompt and parameters in accordance with the present description.

FIG. 8 shows the embodiment of FIGS. 4-7 after the system 201 has merged the inputs. The system 201 displays the results of the search 801 using the merged search elements, that is prompt 702, model 604, and parameters 608. In this example, the system 201 has used prompt analysis and merge engine 206 to merge "68 year old priest with red robe, Vincent Van Gogh" and "an old priest in red." The engine 206, in one embodiment, recognizes the individual words as main descriptions and modifiers. In both prompts "priest" is a main description. "Old," "68 year old," "with red robe," "Vincent Van Gogh," and "in red" are modifiers. It also recognizes that "red robe" and "in red" are overlaps along with "old" and 68 year old." These terms are therefore reduced in the example. The system 201 then receives an instruction to modify the input including updating the prompt 702 to prompt 802 and updating the height 803 and width 804 of the generated image.

When the system receives instruction 805 to generate an image it may generate and display a newly created image. The system may receive this instruction after, for example, the prompt and other search elements are satisfactory. It may also store the new image with its metadata to previously generated image database 203. Once a set of output images are generated, they may be shown on the display 209. A user can choose one of the generated images to download. If the results are not satisfactory, the process can repeat the steps of modifying the input prompt and changing parameters. At any stage whenever one of the returned images from the image search engine meets the expectation, the system can directly download the returned image. Alternatively, the system 201 can also at any time generate a newly generated image using the generation parameters indicated through interface 210.

Figure 9:
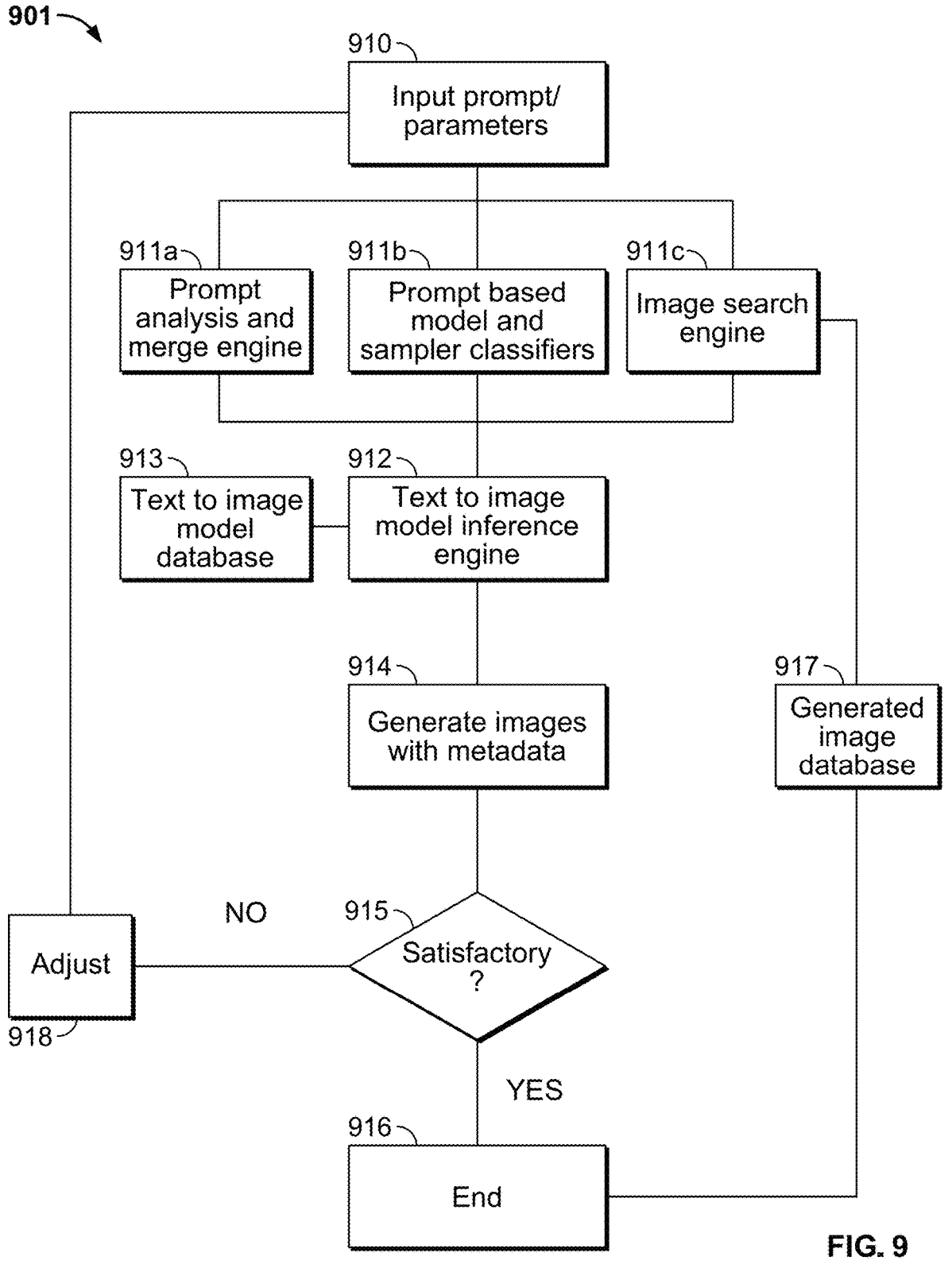
FIG. 9 shows a flowchart of an example process of generating an AI-generated image in accordance with the present description.

FIG. 9 shows an example embodiment of a method of generating an image based on a text prompt. The method may include multiple approaches to optimize the search. In one embodiment, 901 the system and methods include prompt analysis and merge engine 206, image search engine 205, and prompt-based model and sampler classifiers 207 and 208. These elements may work together in an intertwined system, in some embodiments, as shown in FIG. 9. In the embodiment shown in FIG. 9 the method begins with input prompt and/or parameters at step 910. The method then moves to step 911, where it may engage any of prompt analysis search engine 206 at step 911*a*, prompt-based model and sampler classifiers 207 and 208 at step 911*b*, and the image search engine 207 at step 911*c*. Each of steps 911*a*, 911*b*, and 911*c* may interact with each other as well. At step 912 the method processes the text with an image model inference engine 204 which is connected to and may retrieve data from a text-to-image model database 913. At step 914 the method generates result images with their corresponding metadata similar to results 504. It may then receive information at step 915 that the result images are satisfactory. If the results are satisfactory, the method ends at step 916 where it may download an AI-generated image 109 and store that image 109 in the previously generated image database 203 at step 917, and the image may then be available to image search engine at step 911*c*. In one embodiment, "successfully generated images" may be considered images generated and downloaded by the user, which indicates a high likelihood that the user likes the images, and they are a good match for the prompt 102 that generated them. In another embodiment, "successfully generated images" may be considered the output images that pass a quality threshold. In some embodiments, the quality is defined as a weighted combination of image quality metrics and the similarity score of the image embedding and prompt embedding. In one embodiment, the system may offer an option to directly download the returned image(s) 504 from the generated image database 203 as the output. After a download selection, the system 201, in some embodiments, gives the selected image higher chosen score, which may be used for image search in the future. In one embodiment, the system may present an option to "like" a generated image that is returned. This selection may also contribute to an update of the like score of the image for image searching in the future.

If the results are not satisfactory at step 915, the method provides at step 918 an option to adjust the generation elements such as the prompt, model, or sampler. If the method receives an adjustment at step 918 it continues to step 910 and repeats the process with the adjustment.

Figure 10:
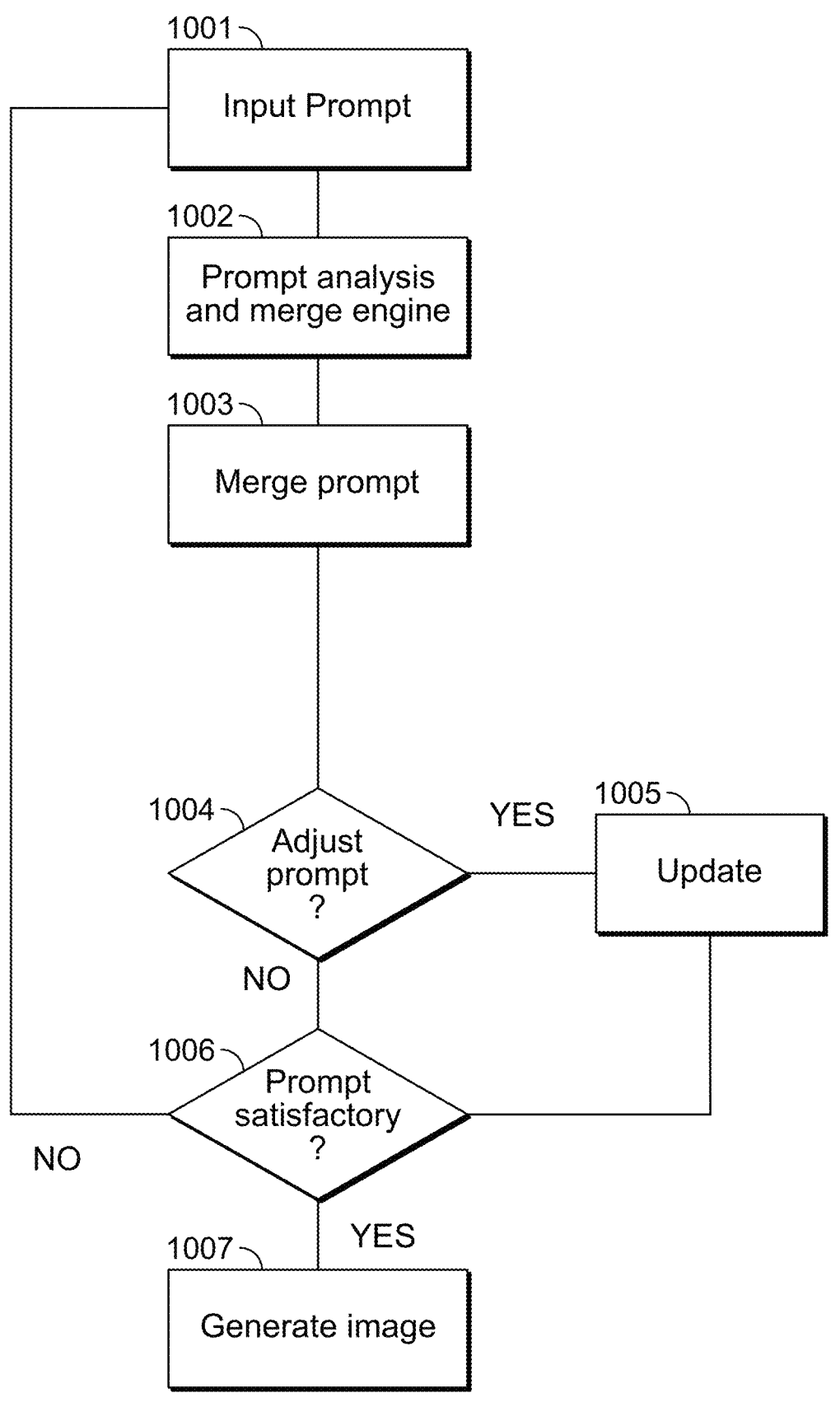
FIG. 10 shows a flowchart of an example method incorporating a prompt analysis and search engine into an image generation method in accordance with the present description.

FIG. 10 shows an example method incorporating a prompt analysis and search engine 206, which may merge prompts, into an image generation method. At step 1001 system receives input prompt akin to prompt 102. At step 1002 the method processes the prompt using a prompt analysis and merge engine. The method then produces a merged prompt at step 1003. The method then may present an option to adjust the merged prompt at step 1004. The method may then receive the adjusted prompt at step 1005 after which it moves to step 1006 where it determines whether the prompt is satisfactory. The method may determine whether the prompt is satisfactory, in one embodiment, based on received input. It may alternatively move to step 1006 without adjusting the prompt from step 1004. If the prompt is satisfactory, the method moves to step 1007 correlating with step 914 after which it follows the method of FIG. 9. If the prompt is not satisfactory, the method returns to 1001 in which it repeats the process to alter the prompt until it is satisfactory.

Figure 11:
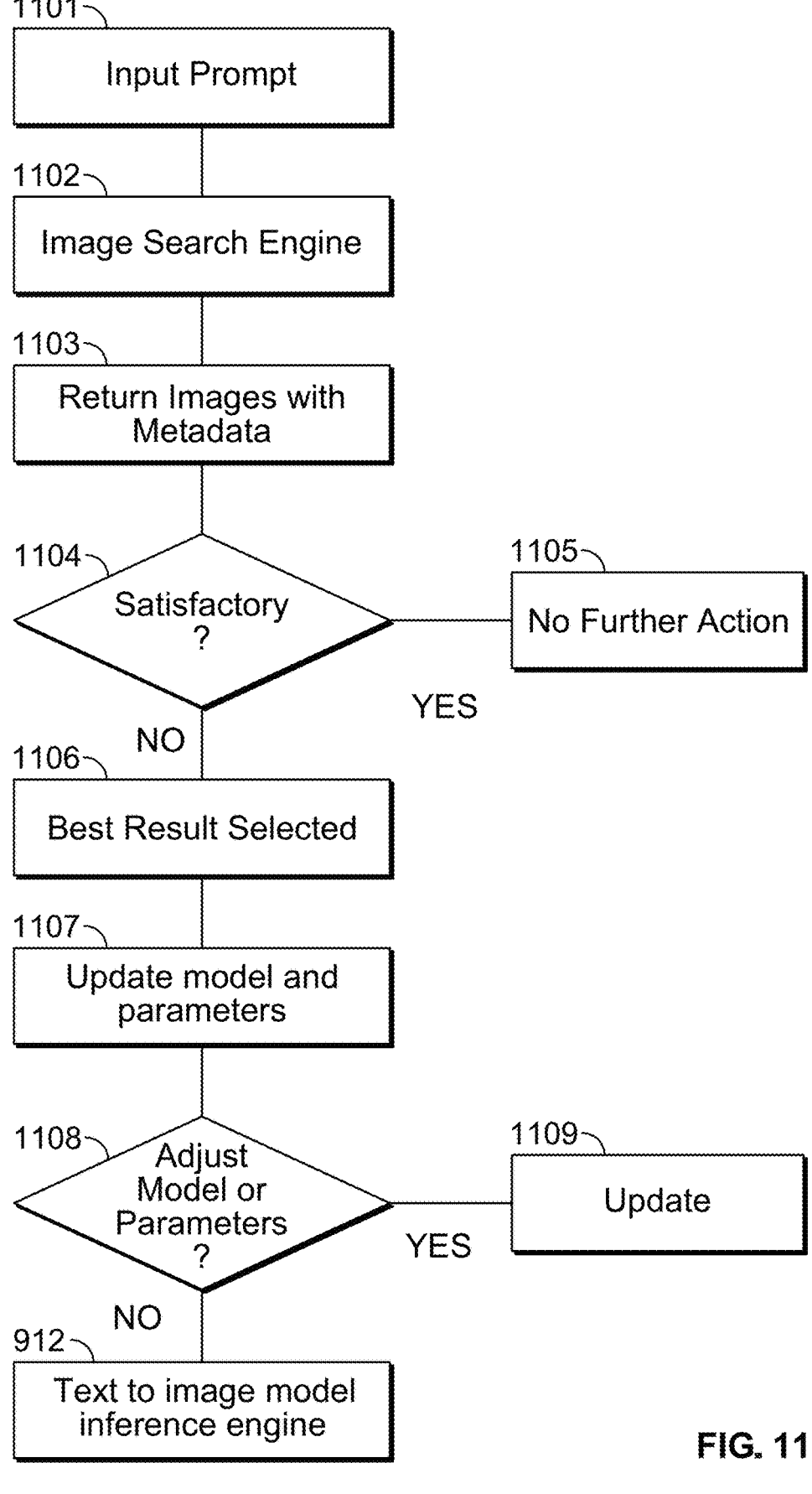
FIG. 11 shows an example method incorporating an image search engine into an image generation method.

FIG. 11 shows an example method incorporating an image search engine 205 into an image generation method. The system receives a prompt akin to prompt 102 at step 1101. The method searches an image search engine at step 1102. The system using the image search engine returns images with metadata as search results at step 1103. The metadata may include for example, successful prompts for the given image or keywords associated with the image. In one embodiment, the system may rank search result images based on a similarity score, which is a combination of several different components: the first component is the similarity score between the input prompt embedding vector and the generated image embedding vector; the second is the similarity score between the input prompt and the prompts used to generate the images in the database using their respective embedding vectors; the third component is an image quality score, measured by Fréchet inception distance (FID) or other equivalent quality metric; other components can contribute to the overall ranking such as image popularity, measured as the number of times that particular image received a "like" or selection for download. All these components are combined using linear weights, which can be pre-defined or computed using machine learning as more users use the service and select particular images. At step 1104 the system analyzes whether the search is successful. Whether the search is successful may hinge on input received regarding satisfaction. If the search is successful, the method moves to step 1105, where no further action takes place. In some embodiments, at this point the system 201 downloads an image from the results. If the search is not successful, the method moves to step 1106 in which it receives a selection of a best result. The best result is akin to the closest match 104*a*. At step 1107 the method analyzes the prompt associated with the best result in a prompt analysis and merge engine of step 911*a* described above, the prompt being a text description or text input that has previously led to the best result in earlier searches. The method may then update the model and parameters by merging the prompt of the best result with the input received.

The method may automatically update the model and parameters associated with the search using the model and parameters indicated in the metadata of the best result. At step 1108 the method may present an option to adjust the model or parameters. If the model or parameters are not updated, the system moves to step 912 and follows the method of FIG. 9. If the model or parameters are adjusted, the method makes these updates at step 1109 after which it turns to step 912.

Figure 12:
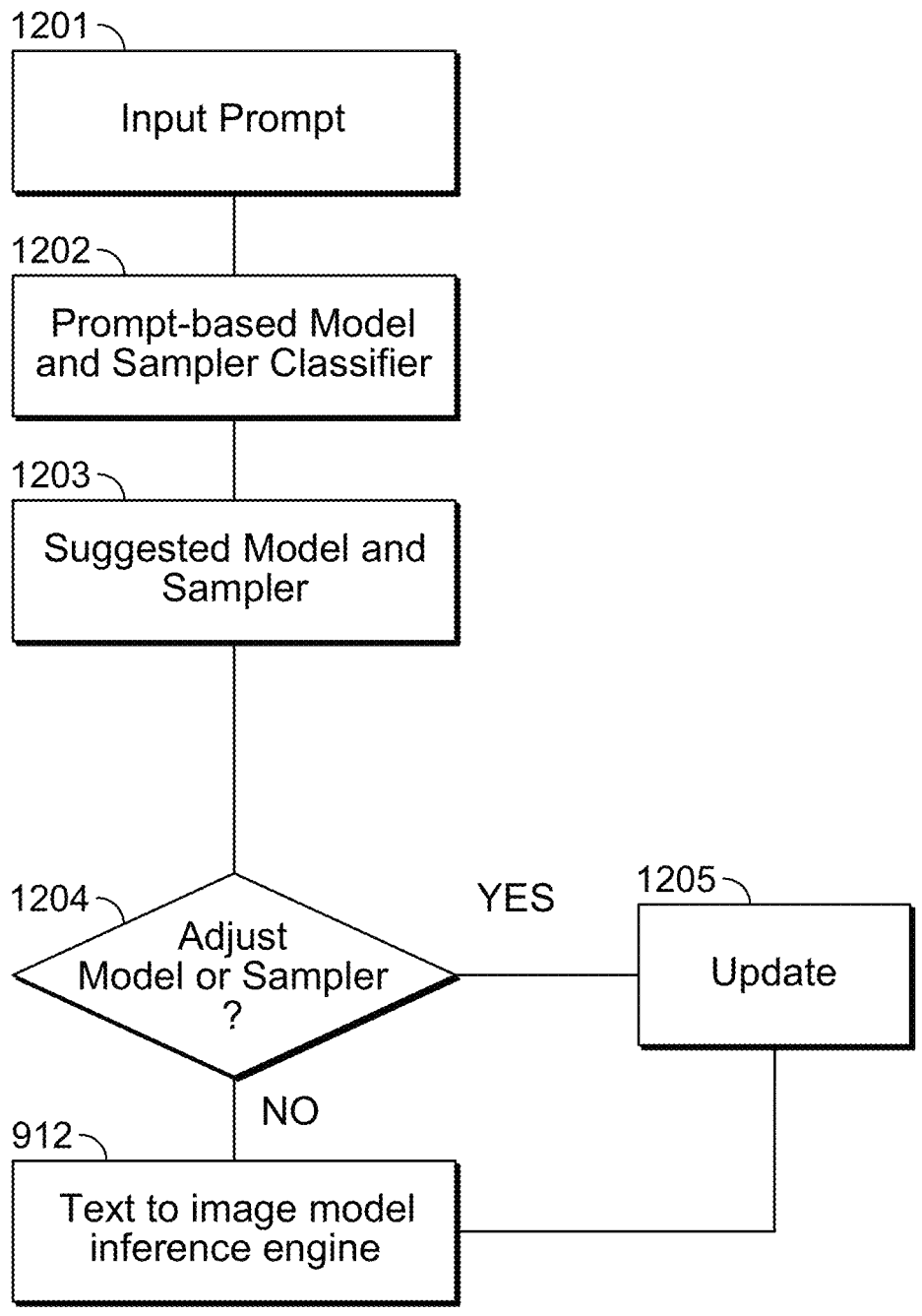
FIG. 12 shows an example method of an image generation method.

FIG. 12 shows an example method of an example embodiment of approach 911*c* into an image generation method. At step 1201 the system receives an input prompt akin to prompt 102. At step 1202, the method analyzes the prompt, using a prompt based model and sampler classifier. Using the prompt based model and sampler classifier the method determines a suggested model and sampler and displays these suggestions at step 1203. At step 1204 the method presents an option to adjust the model or sampler. If at step 1204 it does not receive an indication to adjust the model or sampler the method moves to step 912 and follows the method of FIG. 9. If at step 1204 it does receive an indication to adjust the model or sampler the method moves to step 1205 where it makes the update and moves to 912 to follow the method of FIG. 9.

Figure 13:
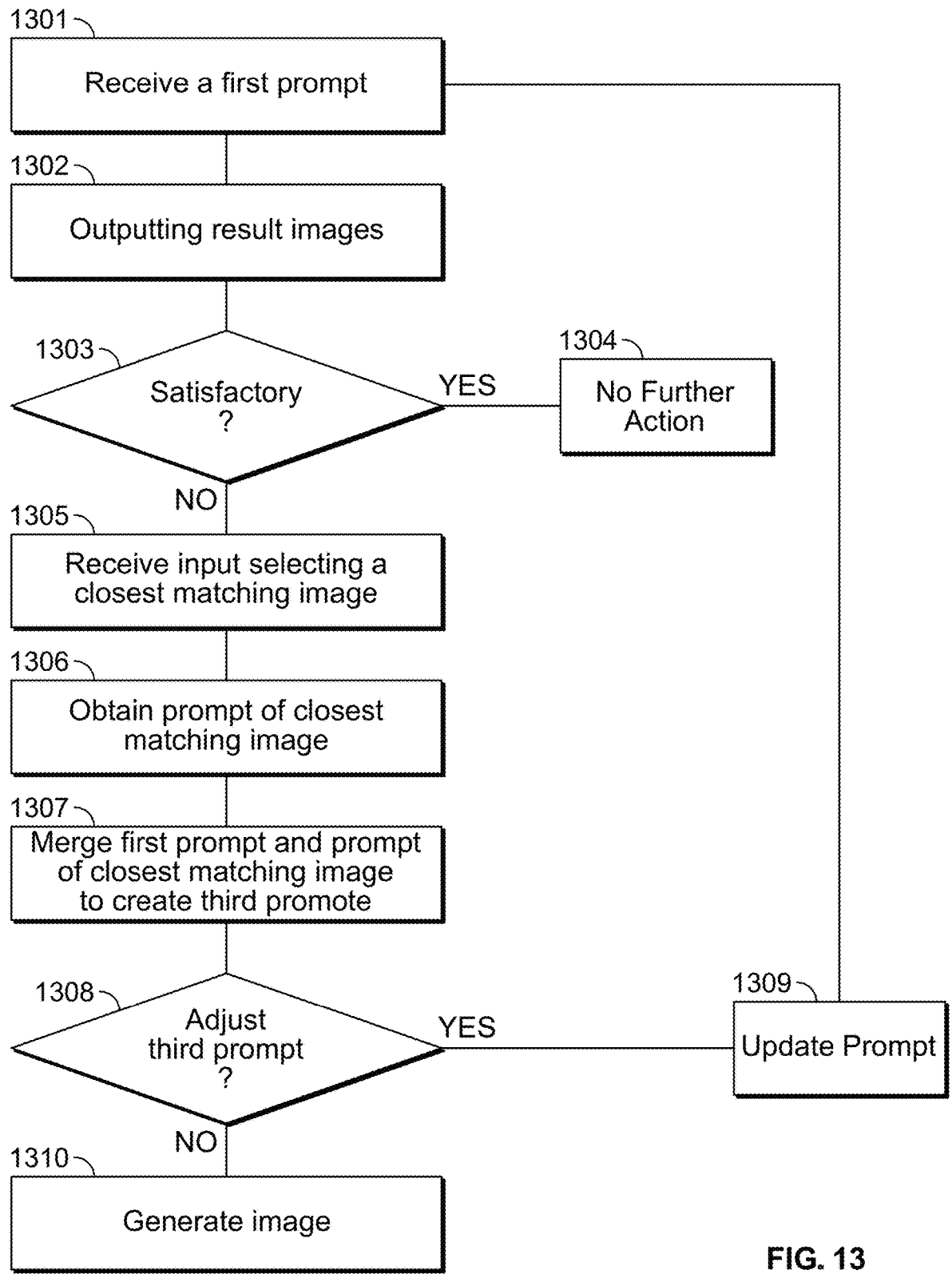
FIG. 13 shows an example process of image generation in accordance with the present description.

FIG. 13 shows an example process of the described process. At the first step 1301 the system 201 receives a first prompt. At 1302 the system 201 outputs result images and determines at step 1303 if the images are satisfactory. If the images are satisfactory, the process moves to step 1304 where no further action takes place. In some embodiments, the system 201 may download an image from the results at step 1304. If the results are not satisfactory, the system moves to step 1305 to receive input selecting a closest matching image, akin to closest image 104*a*, from the result images output at step 1302. Next at step 1306 the system 201 obtains a prompt from the closest matching image. The system 201 then merges the prompt from the closest image with the original prompt received in step 1301 to create a third prompt in step 1307. The system next determines if the third prompt should be adjusted at step 1308. If yes, it updates the prompt at step 1309. It may then repeat steps 1301-1308 with the updated prompt. If the system 201 determines the prompt should not be adjusted, the system generates an image using the prompt at step 1310.

The system 201 may be implemented using any suitable architecture. For example, it may be a stand-alone application wholly-implemented on user equipment device. In such an approach, instructions of the application may be stored locally, and data for use by the application is downloaded on a periodic basis (e.g., from an out-of-band feed, from an Internet resource, or using another suitable approach). Control circuitry may retrieve instructions of the application from storage and process the instructions to provide image generation and selection discussed herein. Based on the processed instructions, control circuitry may determine what action to perform when input is received from user interface 210. For example, movement of a cursor on a display up/down may be indicated by the processed instructions when user interface 210 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Figure 14A:
FIGS. 14a-14h show the impact of the various generation parameters on image generation in accordance with present description.
Figure 14A:
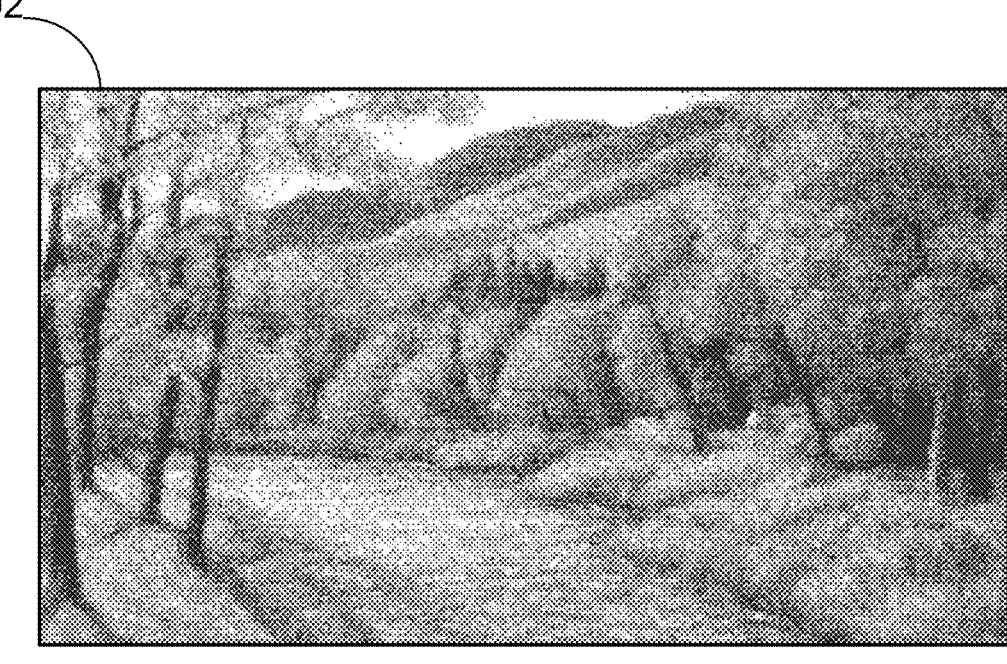

FIGS. 14a-14h shows the impact of the various search elements. FIG. 14a shows an AI-generated image 1401. Diffusion models allow users to input "negative prompts" i.e., things they don't want to see in the resulting picture. For example, using the same prompt that generated image 1401 but adding "frame" as a negative prompt results in updated image 1402, which is an image also responsive to the prompt but without a frame as requested in the negative prompt.

Figure 14B:
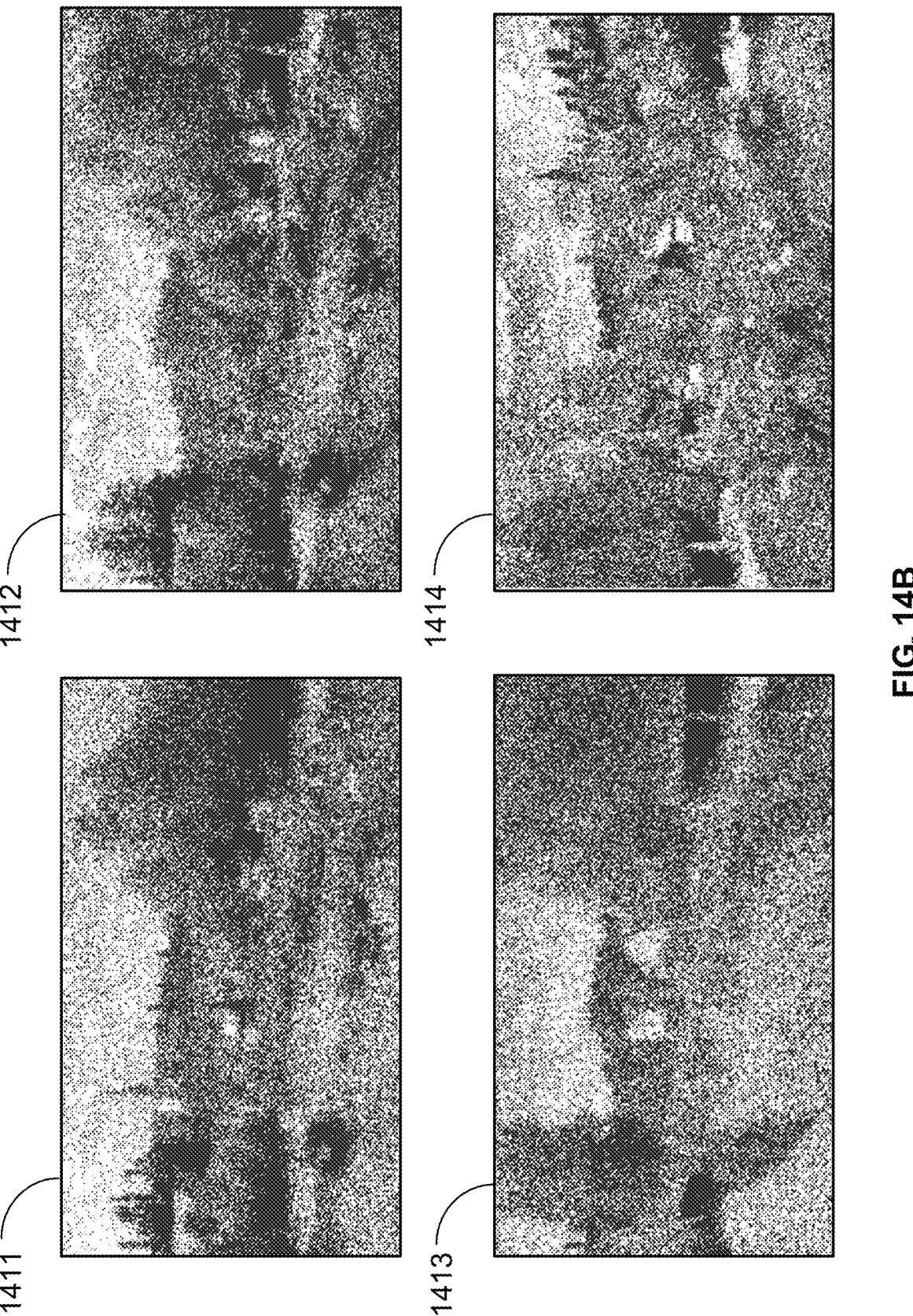

FIG. 14b shows the impact a prompt 102 may have on a generated image. Adding qualifiers to a prompt such as an era indication (1850, 1860, 1870, for example, or "Middle Ages"), an artist or a combination of artists (e.g., "by Auguste Renoir and Claude Monet"), lighting conditions, focus distance, framing instruction, etc. may help the system 201 generate a satisfactory image more quickly. The images of FIG. 14b illustrate the impact of prompt variations. The prompt of image 1411 is "a detailed painting, small village in a sunny fall landscape, crisp and sharp, 1890, 1880, 1870, Terry Redlin, intricate detailed." The prompt of image 1412 is "a detailed painting, small village in a sunny fall landscape, crisp and sharp, 1890, 1880, 1870, Terry Redlin, intricate detailed, innovation, bright modern style, artstation, unreal render, depth of field, ambient lighting, award winning, stunning." The prompt of image 1413 is "a detailed painting, small village in a sunny fall landscape, crisp and sharp, 1890, 1880, 1870, Claude Monet, intricate detailed, innovation, bright modern style, artstation, unreal render, depth of field, ambient lighting, award winning, stunning." The prompt of image 1414 is "a detailed painting, small village in a sunny fall landscape, crisp and sharp, 1890, 1880, 1870, Kandinsky, intricate detailed, innovation, bright modern style, artstation, unreal render, depth of field, ambient lighting, award winning, stunning." As FIG. 14b shows, each prompt 102 generates a different image, with some images being more similar than others. For example, images 1411 and 1412 are quite similar with the largest differences being positions of buildings but image 1414 is starkly different and composed of an entirely different style.

Figure 14C:
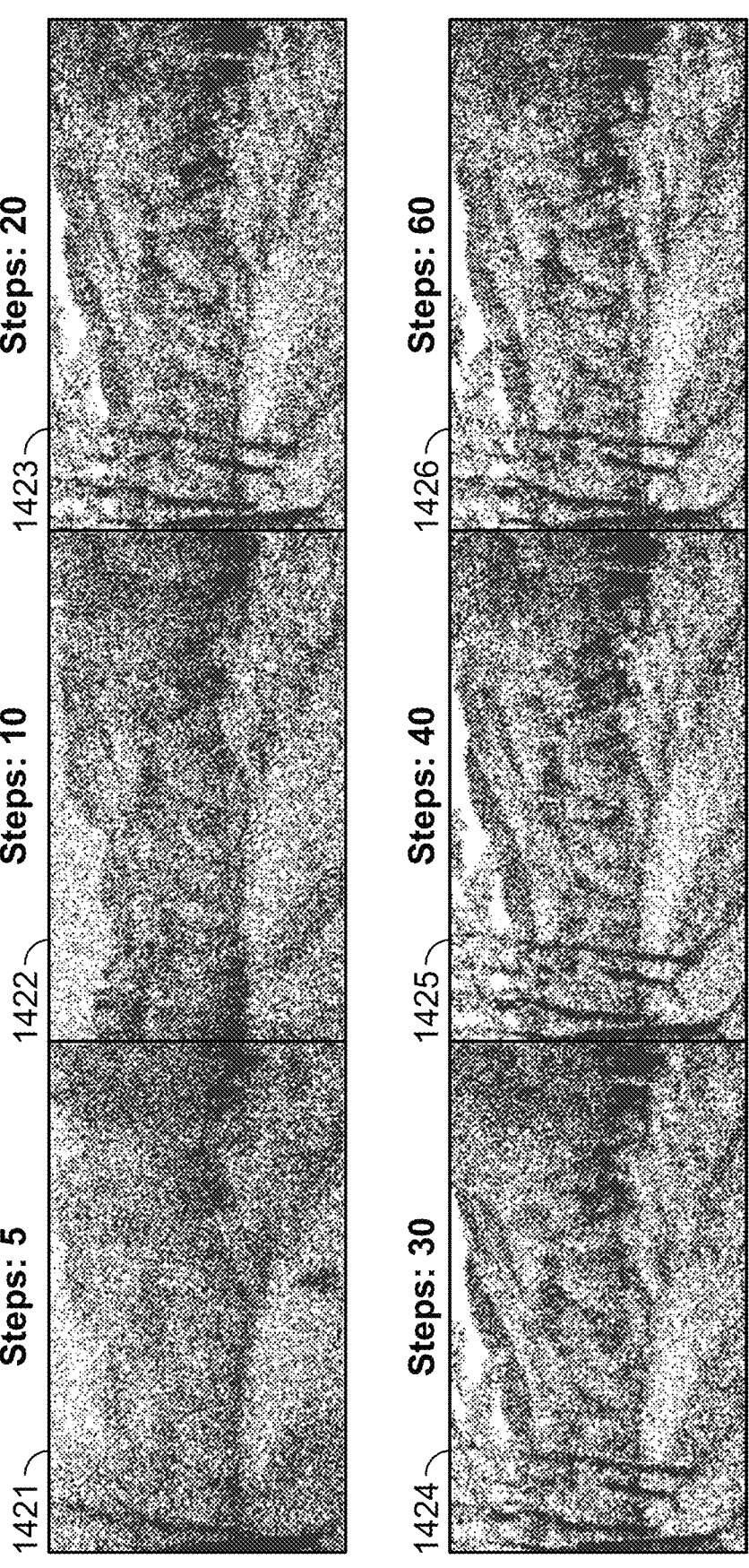
Figure 14D:
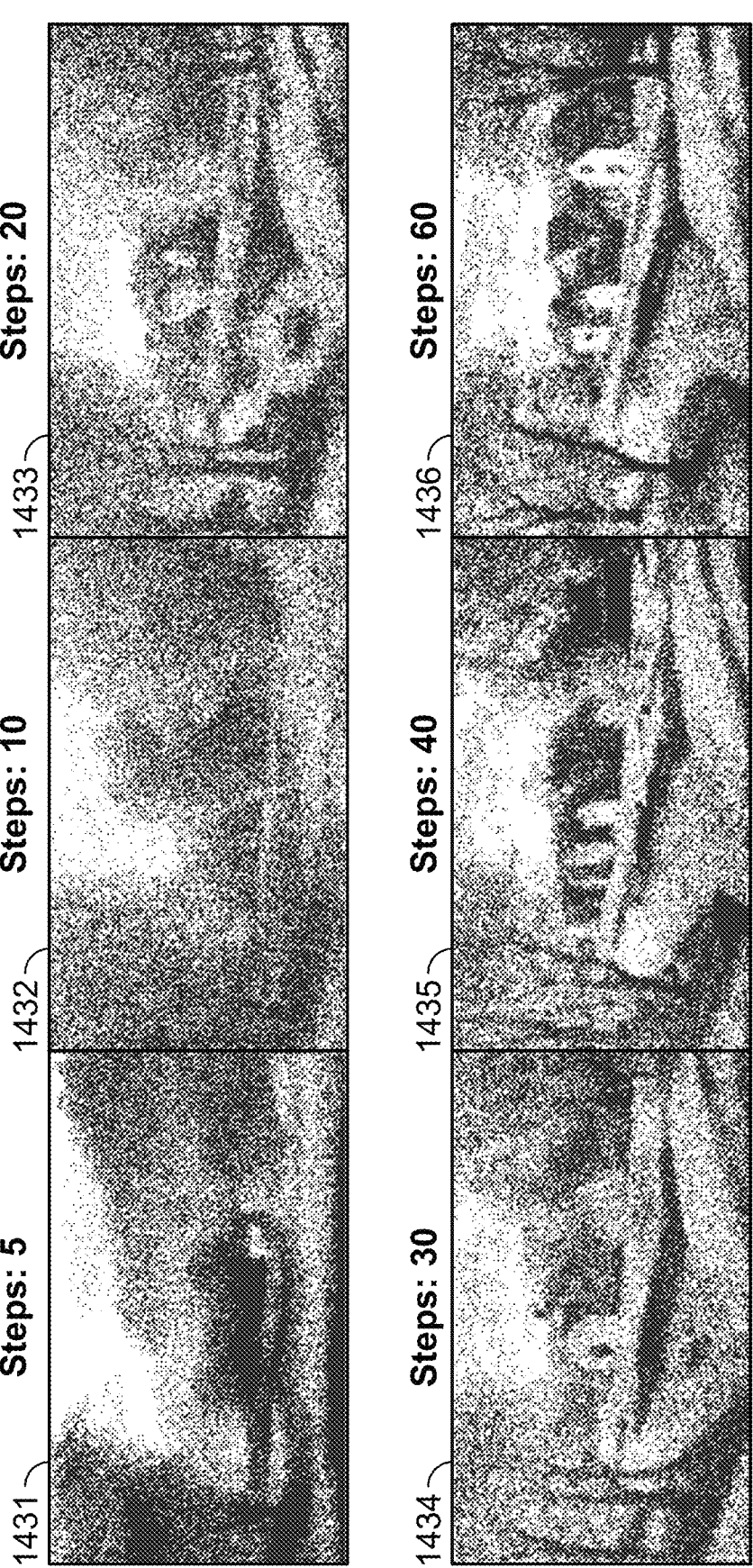

FIG. 14c shows how additional steps, or iterations, may impact a generated image 109. Adding more steps usually leads to more detailed pictures but there are limitations. Image 1421 shows a generated image resulting from an inquiry requesting five steps. Image 1422 shows a generated image resulting from an inquiry requesting 10 steps. Image 1423 shows a generated image resulting from an inquiry requesting 20 steps. Image 1424 shows a generated image resulting from an inquiry requesting 30 steps. Image 1425 shows a generated image resulting from an inquiry requesting 40 steps. Image 1426 shows a generated image resulting from an inquiry requesting 60 steps. In these images, there may not seem to be a lot of change past 20 steps. Results are however highly dependent on the sampler used. Some samplers converge quickly, while others tend to require more iterations to reach a stable picture. FIG. 14d shows the same variations of steps using a different sampler than that of FIG. 14c. Image 1431 shows a generated image resulting from an inquiry requesting five steps. Image 1432 shows a generated image resulting from an inquiry requesting 10 steps. Image 1433 shows a generated image resulting from an inquiry requesting 20 steps. Images 1434 shows a generated image resulting from an inquiry requesting 30 steps. Image 1435 shows a generated image resulting from an inquiry requesting 40 steps. Image 1436 shows a generated image created using 60 steps. The number of iterations as well as the sampler used may be consider jointly in optimizing an AI-generated image system.

Figure 14E:
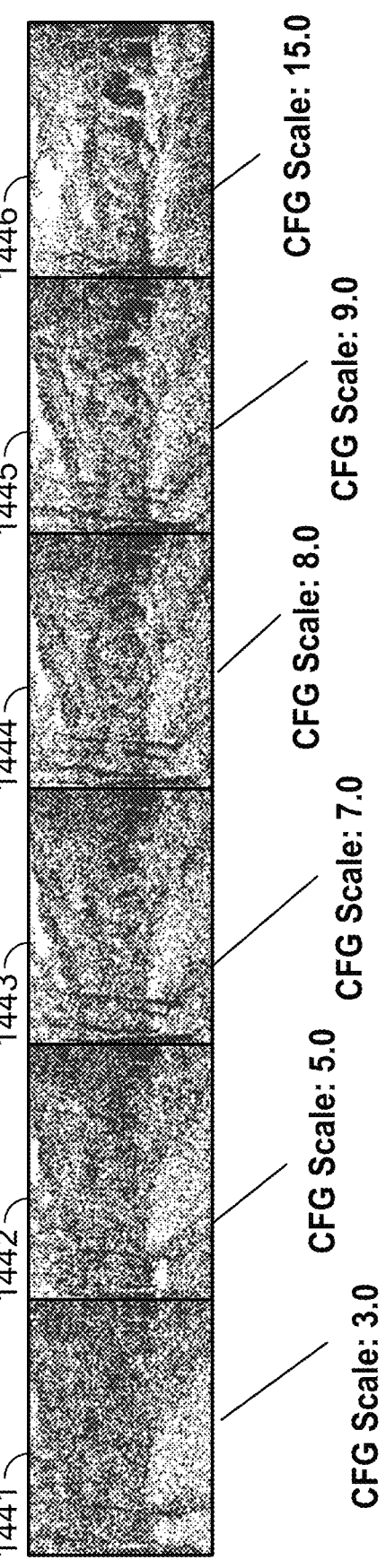

FIG. 14e shows how the level of attention the model may give to each of the words in the prompt affects the generated image 109. Each of these images uses the same value for all elements except the levels of attention. Image 1441 shows a generated image having attention drawn to word number 3. Image 1442 shows a generated image with attention to number 5. Image 1443 shows a generated image with attention to number 7. Image 1444 shows a generated image with attention to number 8. Image 1445 shows a generated image with attention to number 9. Image 1446 shows a generated image with attention to number 15. FIG. 14e illustrates that varying word attention, even if all other elements are the same, can alter a generated image.

Figure 14F:
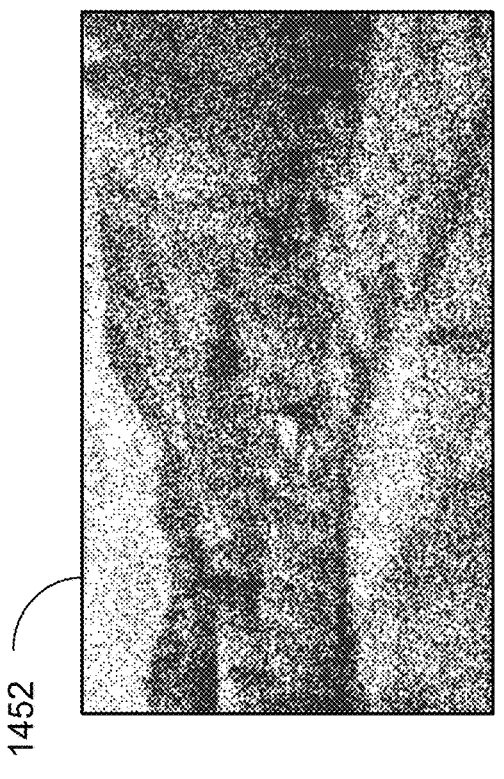
Figure 14F:
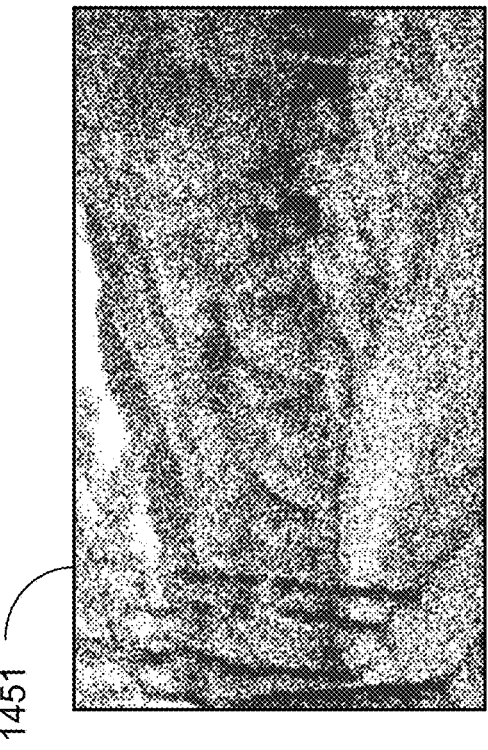
Figure 14F:
Figure 14G:
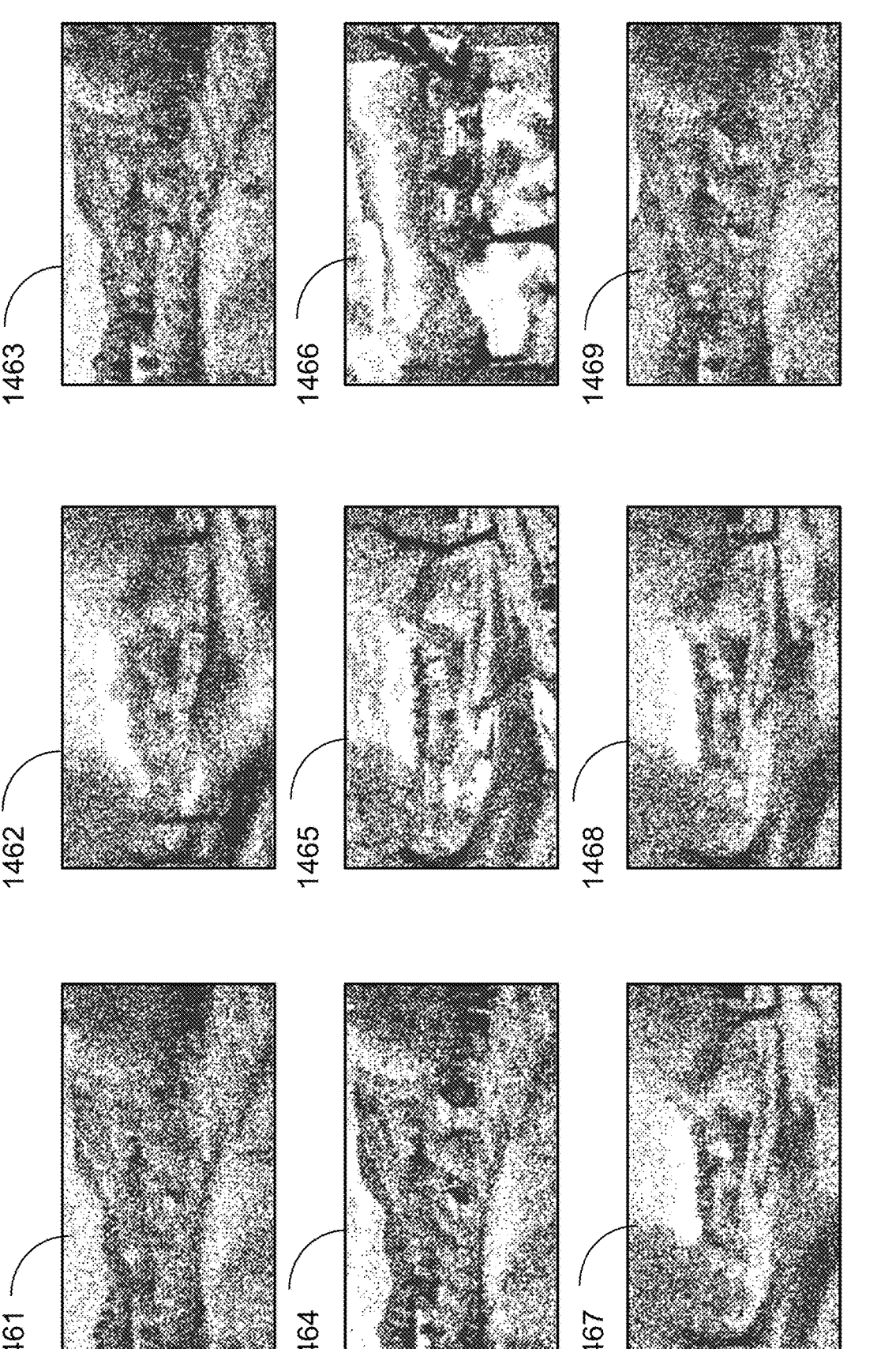
Figure 14H:
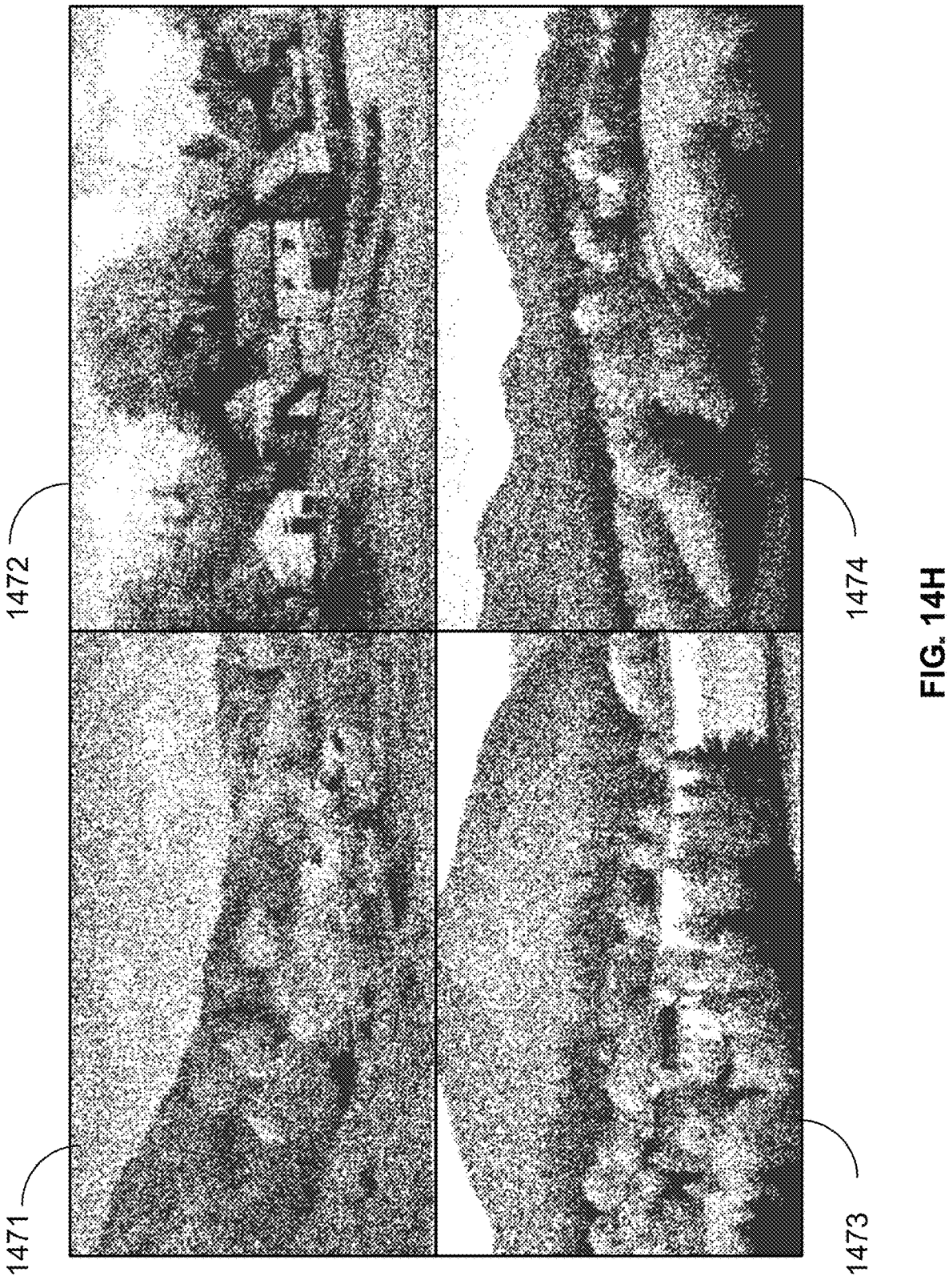

FIG. 14f shows four images with different trained models. In each image all of the other elements are the same, varying only the way the models are trained. Image 1451 uses CompVis' Stable Diffusion 1.4, Image 1452 uses CompVis' Stable Diffusion 1.5, Image 1453 uses Protogen x3.4 (Stable Diffusion 1.5 retrained), and image 1454 uses Stable Diffusion 1.4 overfitted for Sam Yang's style transfer.

One of the trickiest parameters to select is the algorithm (or sampler) used at each step of the image generation. These algorithms are not model dependent, but they greatly influence the final results. There is limited "sampler science" to forecast how well an algorithm performs on a particular type of prompts so again many systems rely on trial and error. The inquiries generating the images in FIG. 14g used the same model, Stable Diffusion model 1.5, the same prompts, the same steps and attention as well as the same seed, but varying samplers. Yet the varied sampler creates a different picture for each image. Image 1461 uses the Euler sampler. Image 1462 uses the Euler a sampler. Image 1463 uses the Heun sampler. Image 1464 uses the DPM2 sampler. Image 1465 uses the DPM2 a sampler. Image 1466 uses the DPM Fast sampler. Image 1467 uses the DPM++25 sampler. Image 1468 uses the DRM a sampler. Image 1469 uses the DDIM sampler.

The last parameter discussed here is the "seed" which is the initial value of the random number generator that starts the diffusion model. The seed leads to a wide variety of outputs. All the images in FIG. 14g were generated using the same seed to show the impact of each parameter individually since the impact of varying the seed is drastic. Inquiries generating the images in FIGS. 14h, 1471, 1472, 1473, and 1474 each used the same prompt but seeds varied.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:

receiving, via a user interface, a first prompt for generating a first content item using a first generative artificial intelligence (AI) model;

retrieving, based on the first prompt and from a database of stored AI-generated content items, a plurality of content items;

receiving input selecting a content item from the plurality of retrieved content items;

identifying a second prompt used to generate the selected content item;

merging, using a trained natural language processing model, the first prompt with the second prompt to create a third prompt;

modifying the third prompt based on second input received via the user interface; and generating, using a second generative AI model and based on the modified third prompt, a second content item.

2. The method of claim 1, wherein merging, using the trained natural language processing model, the first prompt with the second prompt to create the third prompt further comprises segmenting the first and second prompts, and designating a main description and modifiers.

3. The method of claim 1, further comprising suggesting a suggested model based on the first prompt, and wherein generating the second content item is performed using the suggested model.

4. The method of claim 1, further comprising suggesting a suggested sampler based on the first prompt, and wherein generating the second content item is performed using the suggested sampler.

5. The method of claim 1, further comprising ranking the plurality of content items based on a similarity score.

6. The method of claim 5, wherein the similarity score of a respective content item is based on at least a similarity between an embedding vector of the first prompt and an embedding vector of the respective content item, a similarity between the first prompt and prompts used to generate the plurality of content items using their respective embedding vectors, and an image quality of the respective content item.

7. The method of claim 1, wherein the trained natural language processing model includes a sentence merging model.

8. The method of claim 1, further comprising displaying metadata of the selected content item upon receiving the input selecting the selected content item.

9. The method of claim 1, further comprising in response to the merging, determining generation parameters, and wherein the generating the second content item is further based on the generation parameters.

10. The method of claim 1, further comprising receiving a negative prompt, and wherein the merging comprises merging the first prompt, the second prompt, and the negative prompt.

11. The method of claim 1 further comprising:

generating, based at least in part on a text description for the third prompt and one or more generation parameters for the second generative AI model, a fourth prompt, wherein the fourth prompt comprises one or more of:

the one or more generation parameters in-line with the text description and in a format configured for the second generative AI model; and computer-readable instructions configured to populate one or more parameter fields of the second generative AI model with the one or more generation parameters and the text description.

12. The method of claim 1, wherein the first generative AI model and the second generative AI model are the same.

13. A system comprising:

memory; and processing circuitry configured to:

receive, via a user interface, a first prompt for generating a first content item using a first generative artificial intelligence (AI) model;

retrieve, based on the first prompt and from a database of stored AI-generated content items stored in memory, a plurality of content items;

receive input selecting a content item from the plurality of retrieved content items;

identify a second prompt used to generate the selected content item;

merge using a trained natural language processing model, the first prompt with the second prompt to create a third prompt;

modify the third prompt based on second input received via the user interface; and generate, using a second generative AI model and based on the modified third prompt, a second content item.

14. The system of claim 13, wherein the processing circuitry is further configured to merge, using the trained natural language processing model, the first prompt with the second prompt to create the third prompt further by segmenting the first and second prompts, and designating a main description and modifiers.

15. The system of claim 13, wherein the processing circuitry is further configured to:

suggest a suggested model based on the first prompt, and generate the second content item by using the suggested model.

16. The system of claim 13, wherein the processing circuitry is further configured to:

suggest a suggested sampler based on the first prompt, and generate the second content item by using the suggested sampler.

17. The system of claim 13, wherein the processing circuitry further configured to rank the plurality of content items based on a similarity score.

18. The system of claim 17, wherein the similarity score of a respective content item is based on at least a similarity between an embedding vector of the first prompt and an embedding vector of the respective content item, a similarity between the first prompt and prompts used to generate the plurality of content items using their respective embedding vectors, and an image quality of the respective content item.

19. The system of claim 13, wherein the trained natural language processing model includes a sentence merging model.

20. The system of claim 13, wherein further the processing circuitry is further configured to display metadata of the selected content item upon receiving the input selecting the selected content item.

\* \* \* \* \*